(12) United States Patent
Liao et al.

(10) Patent No.: US 12,745,281 B2
(45) Date of Patent: Sep. 22, 2026

(54) DATA TRANSMISSION METHOD AND APPARATUS

(71) Applicant: HUAWEI TECHNOLOGIES CO., LTD., Shenzhen (CN)

(72) Inventors: Shuri Liao, Shanghai (CN); Youlong Cao, Shanghai (CN); Erkai Chen, Kista (SE); Shengyue Dou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 18/354,545

(22) Filed: Jul. 18, 2023

(65) Prior Publication Data

US 2023/0362979 A1 Nov. 9, 2023

Related U.S. Application Data

(63) Continuation of application No. PCT/CN2021/072512, filed on Jan. 18, 2021.

(51) Int. Cl.
*H04W 72/566* (2023.01)
*H04W 72/12* (2023.01)

(52) U.S. Cl.
CPC ......... *H04W 72/569* (2023.01); *H04W 72/12* (2013.01)

(58) Field of Classification Search
None
See application file for complete search history.

(56) References Cited

U.S. PATENT DOCUMENTS

| | | | | |
|---|---|---|---|---|
| 2008/0112428 | A1* | 5/2008 | Seidel ................. | H04W 72/566 370/436 |
| 2017/0099671 | A1* | 4/2017 | Li ......................... | H04W 72/21 |
| 2018/0020472 | A1 | 1/2018 | Lin et al. | |
| 2018/0199315 | A1* | 7/2018 | Hong .................... | H04W 76/15 |
| 2020/0383004 | A1* | 12/2020 | Hande ................... | H04W 24/08 |

FOREIGN PATENT DOCUMENTS

| | | | |
|---|---|---|---|
| CN | 101471919 | A | 7/2009 |
| CN | 105450785 | A | 3/2016 |
| CN | 105813213 | B | 11/2019 |
| CN | 110636554 | A | 12/2019 |
| CN | 110677354 | A | 1/2020 |
| WO | 2019161269 | A1 | 8/2019 |

* cited by examiner

*Primary Examiner* — Yaotang Wang

(57) ABSTRACT

This application provides a data transmission method and an apparatus, which provide integrity transmission for extended reality data transmission. In the method, integrity transmission is performed on data or information having a synchronization requirement or having a dependency relationship, to satisfy the requirement of synchronization between the data or information, thereby improving user experience of XR services.

15 Claims, 5 Drawing Sheets

DATA TRANSMISSION METHOD AND APPARATUS

CROSS-REFERENCE TO RELATED APPLICATIONS

This application is a continuation of International Application No. PCT/CN2021/072512, filed on Jan. 18, 2021, the disclosure of which is hereby incorporated by reference in its entirety.

TECHNICAL FIELD

This application relates to the field of communication technologies, and in particular, to a data transmission method and an apparatus.

BACKGROUND

In recent years, in response to continuous progress and improvement of an extended reality (extended reality, XR) technology, related industries have developed vigorously. Virtual reality has been widely used in fields that are closely related to people's production and life, such as education, entertainment, military affairs, medical care, environmental protection, transportation, and public health. Compared with a conventional video service, the virtual reality (virtual reality, VR) has advantages such as multiple perspectives and strong interaction, providing a brand-new visual experience for a user, which has great application value and commercial potential. XR is a general term for the virtual reality VR, augmented reality (augmented reality, AR), and mixed reality (mix reality, MR), which is widely used in many fields such as entertainment, games, medical care, advertising, industry, online education and engineering.

With continuous development and improvement of VR devices, content, and platforms, a fifth generation (5th generation, 5G) mobile communication technology and even a next generation network system, studying an effective transmission manner of an XR service and improving a network capacity of the XR service can effectively promote development of the end-to-end (end to end, E2E) industry. Therefore, the effective transmission manner of the XR service is of great practical value.

SUMMARY

Embodiments of this application provide a communication method and an apparatus.

According to a first aspect, an embodiment of this application provides a communication method. The method may be performed by a radio access network device, or may be performed by a component (such as a processor, a chip, or a chip system) of the radio access network device, which includes: obtaining service feature configuration information of data, configuring to-be-transmitted data in the data based on the service feature configuration information and untransmitted data and/or transmitted data in the data; and communicating with a terminal based on the configuration of the to-be-transmitted data. Optionally, the data is obtained by the server by encoding and/or rendering source data of the XR.

According to the method, a transmission method is designed from a perspective of improving an accuracy rate and a satisfaction rate of a cell user of an XR video frame, a video frame tile, or a video frame tile, and integrity transmission is performed on an XR video service, thereby improving an accuracy rate of an XR data packet and a satisfaction rate of a cell user. User experience of the XR service is improved. The foregoing video frame slice or video frame tile means that a video frame may be encoded based on area division during encoding, and the divided area is referred to as a video frame slice or a video frame slice.

With reference to the first aspect, in some implementations of the first aspect, the data may correspond to data of one picture frame, data of a same slice (slice) in the picture frame, or data of a same tile (tile) in the picture frame. In this way, data of a same picture frame, data of a same slice in the picture frame, or data of a same tile in the picture frame may be considered as a whole for transmission on a radio access network device side, thereby improving user experience on a video picture. It may be understood that the picture frame in this application may alternatively be a video frame, a data frame, or the like, which is not specifically limited in this application.

With reference to the first aspect, in some implementations of the first aspect, the obtaining service feature configuration information of data includes: obtaining the service feature configuration information based on configuration of a core network element. In this implementation, integrity transmission of data can be performed on the radio access network device side based on a data integrity transmission requirement of a core network, thereby improving user experience of the XR service.

With reference to the first aspect, in some implementations of the first aspect, the service feature configuration information indicates service type information and/or integrity information of the data. The service type information indicates a service type (for example, the XR service) to which the data belongs. The integrity information may indicate one or more of the following: whether a plurality of data packets belong to a whole; whether the plurality of data packets need to be transmitted as a whole; frame information, frame tile information, or frame slice information of the plurality of data packets; and information about a data volume size of the frame, the frame tile, or the frame slice to which the plurality of data packets belong. It may be understood that the data volume in this application may be a quantity of data packets or other data volume parameters. In this implementation, data of the same picture frame, data of the same slice, or data of the same tile may be considered as a whole for transmission, thereby improving user experience on the video picture.

With reference to the first aspect, in some implementations of the first aspect, the service feature configuration information includes one or more of 5G quality of service identifier (5G quality identity, 5QI) information, quality of service flow identifier (QoS flow identifier, QFI) information, quality of service profile (QoS profile) information, bearer information, or general packet radio service tunneling protocol (general packet radio service tunneling protocol, GTP) information. In this implementation, the service feature configuration information can be received and identified, so that integrity transmission of data in the radio access network device is supported, and user experience of the XR service is improved.

For example, the service type information indicated by the service feature configuration information may be carried by using a service type information attribute in the 5QI information, the QFI information, the quality of service profile information, or the GTP information. Alternatively, the core network may be implemented by configuring the corresponding bearer information or the corresponding 5QI information for the XR service. In this manner, the radio access network device may obtain the service type information of the service corresponding to the foregoing data.

For another example, the integrity information indicated by the service feature configuration information may be carried by using an integrity information attribute in the 5QI information, the QFI information, the quality of service profile information, or the GTP information. Alternatively, the core network may be implemented by configuring the corresponding bearer information or the corresponding 5QI information for the XR service. In this manner, the radio access network device may obtain the integrity information of the service corresponding to the foregoing data.

With reference to the first aspect, in some implementations of the first aspect, the service feature configuration information may be configured by the core network element (such as a session management function (session management function, SMF) network element or a user plane function (user plane function, UPF) network element) to the radio access network device. The radio access network device obtains the service feature configuration information based on a configuration of a core network element. In this manner, the radio access network device may identify and receive the service feature configuration information corresponding to the foregoing data.

With reference to the first aspect, in some implementations of the first aspect, the service type to which the data belongs is determined by perceiving a data volume and a period of the data. For example, by perceiving that the foregoing data arrives periodically and the data volume is greater than a first threshold (for example, 1 Mbit/s), it may be determined that the service type of the data is the XR service type. In this manner, the overhead of transmission signaling is effectively reduced, the efficiency of use of transmission resources is improved, and user experience of the XR service is improved.

With reference to the first aspect, in some implementations of the first aspect, the configuring to-be-transmitted data in the data based on untransmitted data and/or transmitted data in the data includes: setting a priority for the to-be-transmitted data in the data based on the untransmitted data and/or the transmitted data in the data. In this manner, a user data packet transmission scheduling priority is set, thereby improving the correct rate of XR video frame transmission and the overall user satisfaction rate of the cell, and improving user experience of the XR service.

With reference to the first aspect, in some implementations of the first aspect, the setting a priority for to-be-transmitted data based on the untransmitted data and/or the transmitted data includes: setting a priority for the to-be-transmitted data based on a data volume of the untransmitted data and/or a data volume of the transmitted data, and based on one or more of a transmission delay of the transmitted data, an estimated transmission delay of the untransmitted data, a correct receiving rate of the transmitted data, an instantaneous transmission rate, or a historical transmission rate. In this manner, a user data packet transmission scheduling priority is set, thereby improving the correct rate of XR video frame transmission and the overall user satisfaction rate of the cell, and improving user experience of the XR service.

With reference to the first aspect, in some implementations of the first aspect, the configuring to-be-transmitted data in the data based on untransmitted data and/or transmitted data in the data includes: skipping sending a data unit of the to-be-transmitted data based on the untransmitted data and/or the transmitted data of the foregoing data. In this manner, the integrity transmission is performed on the user data packet, thereby improving an XR video frame transmission accuracy rate and an overall user satisfaction rate of a cell, and improving user experience of an XR service.

With reference to the first aspect, in some implementations of the first aspect, the skipping sending a data unit of to-be-transmitted data based on the untransmitted data and/or the transmitted data of the data includes: skipping sending a data unit of the to-be-transmitted data when the transmitted data is incorrectly transmitted, or when an estimated transmission time period of the untransmitted data is greater than a transmission time period threshold, or when the correct receiving rate of the transmitted data is less than a correct receiving rate threshold. In this manner, the integrity transmission is performed on the user data packet, thereby improving an XR video frame transmission accuracy rate and an overall user satisfaction rate of a cell, and improving user experience of an XR service.

With reference to the first aspect, in some implementations of the first aspect, the communicating with a terminal based on the configuration of the to-be-transmitted data includes: sending transmission indication information of the to-be-transmitted data to the terminal, where the transmission indication information is used for processing the transmitted data. Optionally, the transmission indication information is used for indicating an integrity transmission criterion of the data, a quantity of data packets included in the to-be-transmitted data, and a data unit to which the data packet of the to-be-transmitted data belongs. Optionally, the transmission indication information is used for indicating a data unit to which a to-be-transmitted data packet that is not sent belongs. In this manner, an integrity transmission requirement of the XR video frame can be met, and user experience of the XR service can be improved.

The transmission indication information may be carried in a radio resource control (radio resource control, RRC) message, downlink control information (downlink control information, DCI), or a media access control control element (media access control control element, MAC CE). For example, the radio access network device notifies, by using the RRC message, the terminal of the integrity transmission criterion of the current service, the quantity of data packets included in the to-be-transmitted data, a data unit to which the data packet of the to-be-transmitted data belongs, and a data unit to which the to-be-transmitted data packet that is not sent belongs. For another example, the radio access network device notifies the terminal of the integrity transmission criterion of a current service by using the RRC message, and indicates, by using the DCI or the MAC CE, a quantity of data packets included in the to-be-transmitted data, a data unit to which a data packet of the to-be-transmitted data belongs, and a data unit to which the to-be-transmitted data packet that is not sent belongs. For another example, the radio access network device indicates, by using the DCI or the MAC CE, an integrity transmission criterion, a quantity of data packets included in to-be-transmitted data, a data unit to which a data packet of to-be-transmitted data belongs, and a data unit to which a to-be-transmitted data packet that is not sent belongs.

According to a second aspect, an embodiment of this application provides a communication method. The method may be performed by a terminal device, or may be performed by a component (such as a processor, a chip, or a chip system) of a user terminal device, and includes: receiving transmission indication information from the radio access network device, and receives integrity of the data based on the transmission indication information. Optionally, the data is obtained by the server by encoding and/or rendering source data of the XR.

According to the method, an integrity transmission method can be performed based on a service characteristic of the XR video service, and the correct rate of the XR data packet and the satisfaction rate of the cell user can be improved, thereby improving user experience of the XR service.

With reference to the second aspect, in some implementations of the second aspect, the data may correspond to data of one picture frame, data of a same slice in the picture frame, or data of a same tile in the picture frame. In this way, data of a same picture frame, data of a same slice in the picture frame, or data of a same tile in the picture frame may be considered as a whole for transmission, thereby improving user experience on a video picture.

With reference to the second aspect, in some implementations of the second aspect, the receiving integrity of the data based on the transmission indication information includes: processing the transmitted data based on the transmission indication information. Optionally, the transmission indication information is used for indicating an integrity transmission criterion of the data, a quantity of data packets included in the to-be-transmitted data, and a data unit to which the data packet of the to-be-transmitted data belongs. Optionally, the transmission indication information is used for indicating a data unit to which a to-be-transmitted data packet that is not sent belongs. In this manner, the terminal can perform packet loss on all or some data packets of the video frame based on the information, thereby reducing data transmission that does not contribute to the XR data experience, reducing a waste of transmission resources and improving utilization efficiency of transmission resources.

The transmission indication information may be carried by the RRC message, the DCI, or the MAC CE. For example, the radio access network device notifies, by using the RRC message, the terminal of the integrity transmission criterion of the current service, the quantity of data packets included in the to-be-transmitted data, a data unit to which the data packet of the to-be-transmitted data belongs, and a data unit to which the to-be-transmitted data packet that is not sent belongs. For another example, the radio access network device notifies the terminal of the integrity transmission criterion of a current service by using the RRC message, and indicates, by using the DCI or the MAC CE, a quantity of data packets included in the to-be-transmitted data, a data unit to which a data packet of the to-be-transmitted data belongs, and a data unit to which the to-be-transmitted data packet that is not sent belongs. For another example, the radio access network device indicates, by using the DCI or the MAC CE, an integrity transmission criterion, a quantity of data packets included in to-be-transmitted data, a data unit to which a data packet of to-be-transmitted data belongs, and a data unit to which a to-be-transmitted data packet that is not sent belongs.

In a possible implementation of receiving the integrity of the data based on the transmission indication information, the terminal determines, based on the transmission indication information, that if an incorrectly received data packet exists, the terminal clears the data packet of the current received frame, including the data packet that is successfully decoded and the data packet that fails to be decoded. In this manner, all or some data packets of the video frame in which an error occurs are cleared, so that data transmission that does not contribute to XR data experience can be reduced, thereby reducing a waste of transmission resources and improving utilization efficiency of transmission resources.

In another possible implementation of receiving the integrity of the data based on the transmission indication information, when it is learned that, by using the transmission indication information, the radio access network device has a packet loss case, the terminal clears the data packet of the current received frame, including the data packet that is successfully decoded and the data packet that fails to be decoded. In this manner, all or some data packets of the video frame in which an error occurs are cleared, so that data transmission that does not contribute to XR data experience can be reduced, thereby reducing a waste of transmission resources and improving utilization efficiency of transmission resources.

According to a third aspect, an embodiment of this application provides an apparatus, which can implement the method in any one of the first aspect or the possible implementations of the first aspect. The apparatus includes a corresponding unit or component configured to perform the foregoing method. The unit included in the apparatus may be implemented by software and/or hardware. For example, the apparatus may be a terminal or a network device, or may be a chip, a chip system, a processor, or the like that supports the terminal or the network device in implementing the foregoing method.

According to a fourth aspect, an embodiment of this application provides an apparatus, which can implement the method in any one of the second aspect or the possible implementations of the second aspect. The apparatus includes a corresponding unit or component configured to perform the foregoing method. The unit included in the apparatus may be implemented by software and/or hardware. For example, the apparatus may be a terminal or a network device, or may be a chip, a chip system, a processor, or the like that supports the terminal or the network device in implementing the foregoing method.

According to a fifth aspect, an embodiment of this application provides an apparatus, including: a processor, where the processor is coupled to a memory, the memory is configured to store a program or instructions, and when the program or the instructions is or are executed by the processor, the apparatus is caused to implement the method in any one of the first aspect or the possible implementations of the first aspect.

According to a sixth aspect, an embodiment of this application provides an apparatus, including: a processor, where the processor is coupled to a memory, the memory is configured to store a program or instructions, and when the program or the instructions is or are executed by the processor, the apparatus is caused to implement the method in any one of the second aspect or the possible implementations of the second aspect.

According to a seventh aspect, an embodiment of this application provides a computer-readable storage medium. The computer-readable storage medium stores a computer program or instructions, and when the computer program or the instructions is or are executed, a computer is caused to perform the method in any one of the first aspect or the possible implementations of the first aspect.

According to an eighth aspect, an embodiment of this application provides a computer-readable storage medium. The computer-readable storage medium stores a computer program or instructions, and when the computer program or the instructions is or are executed, the computer is caused to perform the method in any one of the second aspect or the possible implementations of the second aspect.

According to a ninth aspect, an embodiment of this application provides a computer program product, including a computer program code. When the computer program code runs on a computer, the computer is caused to perform the method in any one of the first aspect or the possible implementations of the first aspect.

According to a tenth aspect, an embodiment of this application provides a computer program product, including a computer program code. When the computer program code runs on a computer, the computer is caused to perform the method in any one of the second aspect or the possible implementations of the second aspect.

According to an eleventh aspect, an embodiment of this application provides a chip, including: a processor, where the processor is coupled to a memory, the memory is configured to store a program or instructions, and when the program or the instructions is or are executed by the processor, the chip is caused to implement the method in any one of the first aspect or the possible implementations of the first aspect.

According to a twelfth aspect, an embodiment of this application provides a chip, including a processor, where the processor is coupled to a memory, the memory is configured to store a program or instructions, and when the program or the instructions is or are executed by the processor, the chip is caused to implement the method in any one of the second aspect or the possible implementations of the second aspect.

According to a thirteenth aspect, an embodiment of this application provides a communication system, including the apparatus according to the third aspect and the apparatus according to the fourth aspect.

According to a fourteenth aspect, an embodiment of this application provides a communication system, including the apparatus according to the fifth aspect and the apparatus according to the sixth aspect.

BRIEF DESCRIPTION OF DRAWINGS

FIG. 3 to FIG. 5 are schematic diagrams of several scenarios applicable to an embodiment of this application;

DESCRIPTION OF EMBODIMENTS

Figures 1, 2:
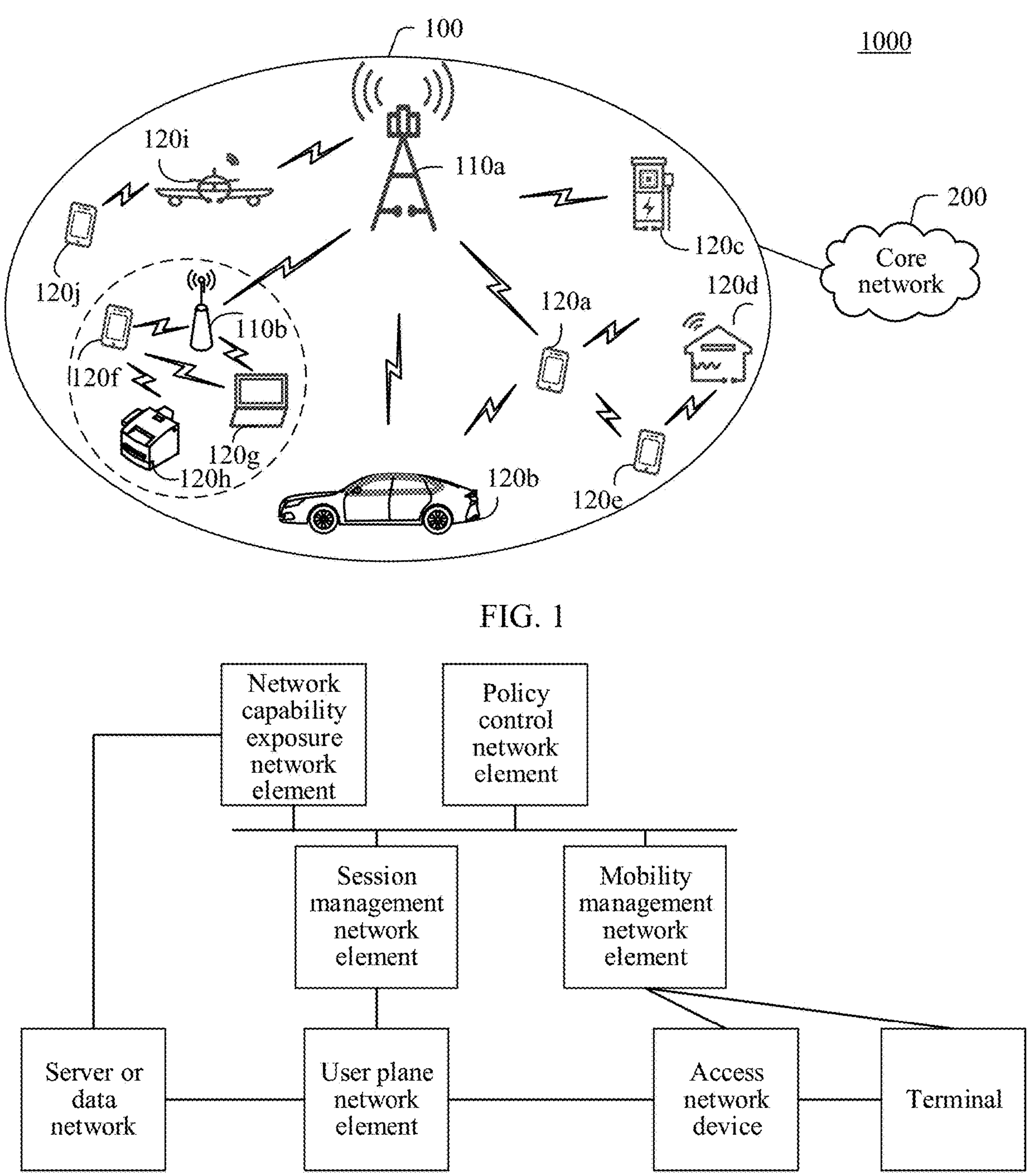
FIG. 1 is a schematic diagram of a communication system applied to an embodiment according to this application.
FIG. 2 is a schematic diagram of an architecture of a communication system applied to an embodiment according to this application.

The method and an apparatus provided in embodiments of this application may be applied to a communication system. FIG. 1 is a schematic architectural diagram of a communication system 1000 applied in an embodiment according to this application. As shown in FIG. 1, the communication system includes a radio access network 100 and a core network 200. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and a radio access network device may be independent and different physical devices, or functions of the core network device and logical functions of the radio access network device are integrated into a same physical device, or a part of functions of the core network device and a part of functions of the radio access network device are integrated into one physical device. A wired or wireless manner may be used for connection between terminals and between radio access network devices. FIG. 1 is only a schematic diagram. The communication system may further include other network devices, for example, may further include a wireless relay device and a wireless backhaul device, which are not shown in FIG. 1.

The radio access network device may be a base station (base station), an evolved NodeB (evolved NodeB, eNodeB), a transmission reception point (transmission reception point, TRP), a next generation base station (next generation NodeB, gNB) in a 5th generation (5th generation, 5G) mobile communication system, a next generation base station in a 6th generation (6th generation, 6G) mobile communication system, a base station in a future mobile communication system or an access node in a Wi-Fi system, and the like; or may be a module or a unit that implements some functions of the base station, for example, may be a centralized unit (central unit, CU), or may be a distributed unit (distributed unit, DU). The radio access network device may be a macro base station (for example, 110*a* in FIG. 1), or may be a micro base station or an indoor station (for example, 110*b* in FIG. 1), or may be a relay node, a donor node, or the like. A specific technology and a specific device form used by the radio access network device are not limited in this embodiment of this application. For ease of description, the following uses an example in which the base station is used as the radio access network device for description.

In this application, the terminal apparatus may be a terminal in an internet of things (internet of things, IoT) system. An IoT is an important component of future information technology development. A main technical feature of the IoT is connecting an object to a network by using a communication technology, to implement an intelligent network of human-machine interconnection and thing-thing interconnection. The terminal in this application may be a terminal in machine type communication (machine type communication, MTC). The terminal in this application may be a vehicle-mounted module, a vehicle-mounted component, a vehicle-mounted chip, or a vehicle-mounted unit that is built in a vehicle as one or more components or units. The vehicle may implement a method in this application by using the vehicle-mounted module, the vehicle-mounted component, the vehicle-mounted chip, or the vehicle-mounted unit that is built in the vehicle. Therefore, embodiments of this application may be applied to an internet of vehicles, for example, vehicle-to-everything (vehicle-to-everything, V2X), long term evolution vehicle (long term evolution vehicle, LTE-V), vehicle-to-vehicle (vehicle-to-vehicle, V2V), and the like.

Alternatively, the terminal in this application may be a virtual reality (virtual reality, VR) terminal device, an augmented reality (augmented reality, AR) terminal device, or a mixed reality (mix reality, MR) terminal device. The VR terminal, the AR terminal, and the MR terminal may all be referred to as an extended reality (extended reality, XR) terminal device. For example, the XR terminal may be a head-mounted device (for example, a helmet or glasses), or may be an all-in-one machine, or may be a television, a display, an automobile, an on-board device, a flat panel, a smart screen, a holographic projector, a video player, a remote management robot, a tactile Internet terminal, or the like. The XR terminal can present XR data to a user. The user can experience diversified XR services by wearing or using the XR terminal. The XR terminal may access a network in a wireless or wired manner, for example, access a network by using a wireless-fidelity (wireless fidelity, Wi-Fi) or a 5G system. The base station and the terminal may be fixed or movable. The base station and the terminal may be deployed on land, including indoor or outdoor, handheld, or vehicle-mounted; may also be deployed on the water surface; and may also be deployed in aircraft, a balloon, and a satellite in the air. An application scenario of the base station and the terminal are not limited in embodiments of this application.

A role of the base station and the terminal may be opposite, for example, the helicopter or UAV 120*i* in FIG. 1 may be configured as the mobile base station, and for the terminal 120*j* accessing the radio access network 100 through 120*i*, the terminal 120*i* is the base station; however, for the base station 110*a*, 120*i* is the terminal, that is, communication between the 110*a* and the 120*i* is performed by using a wireless air interface protocol. Certainly, communication may also be performed between 110*a* and 120*i* by using an interface protocol between base stations. In this case, compared with 110*a*, 120*i* is also the base station. Therefore, both the base station and the terminal may be collectively referred to as a communication apparatus, 110*a* and 110*b* in FIG. 1 may be referred to as a communication apparatus having a base station function, and 120*a* to 120*j* in FIG. 1 may be referred to as a communication apparatus having a terminal function.

Communication between the base station and the terminal, between the base station and the base station, or between the terminal and the terminal may be performed by using a licensed spectrum, or may be performed by using an unlicensed spectrum, or may be performed by using both the licensed spectrum and the unlicensed spectrum. Communication may be performed by using a spectrum below 6 gigahertz (gigahertz, GHz), or may be performed by using a spectrum above 6 GHz, or may be simultaneously performed by using the spectrum below 6 GHz and the spectrum above 6 GHz. A spectrum resource used for wireless communication is not limited in this embodiment of this application.

In embodiments of this application, a function of the base station may be performed by a module (such as a chip) in the base station, or may be performed by a control subsystem including a base station function. A control subsystem that includes a base station function herein may be a control center in an application scenario of the foregoing terminal, such as a smart grid, an industrial control, an intelligent transportation, and a smart city. A function of the terminal may alternatively be performed by a module (such as a chip or a modem) in the terminal, or may be performed by an apparatus including the function of the terminal.

In this application, the base station sends a downlink signal or downlink information to the terminal, where the downlink information is carried on a downlink channel; the terminal sends an uplink signal or uplink information to the base station, where the uplink information is carried on an uplink channel; and the terminal sends a sidelink (sidelink) signal or sidelink information to the terminal, where the sidelink information is carried on a sidelink channel, and the sidelink may also be referred to as a side link, a side-link, SL, or the like.

The method and an apparatus provided in embodiments of this application may be applied to a plurality of communication system architectures. FIG. 2 shows a schematic architectural diagram of a communication system. In the architecture of the communication system, the terminal accesses a core network by using an access network (radio access network, RAN) device. The terminal may establish a connection to a data network (data network, DN) or a server in the data network by using the access network and the core network. The data network may include, for example, a carrier service, the Internet, a third-party service, or the like. In a 4th generation (4th generation, 4G) mobile communication system, the connection may be a packet data network connection (packet data network connection, PDN connection) or a bearer. In a 5G communication system, the connection may be a protocol data unit session (protocol data unit session, PDU Session). In a future communication system such as a 6G communication system, the connection may be a PDU session, a PDN connection, or other similar concepts, which is not limited in the embodiment of this application. In this embodiment of this application, a connection established between the terminal and a data network or a server may also be referred to as a session.

The core network includes a mobility management network element, a session management network element, and a user plane network element. Optionally, the core network further includes a network capability exposure network element and/or a policy control network element.

The mobility management network element is mainly used for mobility management in a mobile network, such as user location update, user registration network, user handover, and so on. In the 4G communication system, the mobility management network element may be a mobility management entity (mobility management entity, MME). In the 5G communication system, the mobility management network element may be an access and mobility management function (access and mobility management function, AMF).

The session management network element is mainly used for session management in the mobile network, for example, session establishment, modification, and release. Specific functions include allocating an internet protocol (internet protocol, IP) address to the user, selecting a user plane network element that provides a packet forwarding function, and the like. In the 4G communication system, the session management network element may be a serving gateway control plane (serving gateway control plane, SGW-C), a packet data network gateway control plane (packet data network gateway control plane, PGW-C), or a network element in which the SGW-C and the PGW-C are integrated. In the 5G communication system, the session management network element may be a session management function (session management function, SMF).

The user plane network element is mainly configured to forward a user data packet according to a routing rule of the session management network element. In the 4G communication system, the user plane network element may be a serving gateway user plane (serving gateway user plane, SGW-U), a packet data gateway user plane (packet data network gateway user plane, PGW-U), or a network element in which the SGW-U and the PGW-U are integrated. In the 5G communication system, the user plane network element may be a user plane function (user plane function, UPF) network element.

The policy control network element includes a subscriber subscription data management function, a policy control function, a charging policy control function, quality of service (quality of service, QoS) control, and the like. In the 4G communication system, the policy control network element may be a policy control and charging function (policy control and charging function, PCRF). In the 5G communication system, the policy control network element may be a policy control function (policy control function, PCF).

The network capability exposure network element is mainly configured to open a capability of a communication system to a third party or an application service function, and transmit information between the third party, an application server, and the communication system. In the 4G communication system, the network capability exposure network element may be a service capability exposure function (service capability exposure function, SCEF). In the 5G communication system, the network capability exposure network element may be a network exposure function (network exposure function, NEF).

In the future communication system such as a 6G communication system, the foregoing network element or device may still use a name of the network element or device in the 4G or 5G communication system, or may have other names. Functions of the foregoing network element or device may be completed by one independent network element, or may be jointly completed by several network elements, which are not limited in the embodiment of this application.

In actual deployment, the network element in the core network may be deployed on the same or different physical devices. For example, in a possible deployment, the AMF and the SMF may be deployed on a same physical device. For another example, the network element of the 5G core network and the network element of the 4G core network may be deployed on a same physical device.

In actual deployment, the network elements on the core network can be co-deployed. For example, the mobility management network element and the session management network element may be co-deployed. For another example, the session management network element and the user plane network element may be co-deployed. When two or more network elements are co-deployed, interaction between the two or more network elements provided in this application becomes an internal operation of the co-deployed network element or may be omitted.

Compared with the core network of the 4G communication system, the core network of the 5G communication system uses an architecture in which a control plane is separated from a user plane and a service-oriented architecture. It may be understood that the solutions in this application are not only applicable to a 5G communication system, but also applicable to an evolved 4G communication system, a future 6G communication system, and the like. A network to which the solution of this application is applicable may use an architecture in which the control plane and the user plane are separated, or may use an architecture in which the control plane and the user plane are integrated. A network to which the solution of this application is applicable may use the service-oriented architecture, or may use a non-service-oriented architecture.

It may be understood that, with evolution of the network, names of the foregoing network elements may change, and functions of the network elements may also be combined, separated, or even changed. However, the changes do not mean that the network elements are out of scope of the solutions in this application.

In the wireless communication network, XR technology has the advantages of multi-view and strong interaction, and can provide a brand-new experience for the user, and has great application value and commercial potential. The XR includes technologies such as VR, AR, and MR, and can be widely used in the field such as entertainment, gaming, medical, advertising, industry, online education, engineering, and so on.

The VR technology mainly refers to the rendering of visual and audio scenes to simulate the visual and audio stimulation of the user in the real world as much as possible. In the VR technology, the user may wear the XR terminal (for example, a head mounted device) to simulate vision and/or hearing for the user. The VR technology can also track movements of the user to update simulated visual and/or auditory content in a timely manner. The AR technology mainly refers to providing visual and/or auditory additional information or artificially generated content in a real environment perceived by the user. The user may acquire the real environment directly (for example, without sensing, processing, and rendering). Alternatively, the acquiring may be indirect (for example, transferred by using a sensor), and further enhancement processing is performed. The MR technology is to insert some virtual elements into the physical scene to provide the user with an immersive experience in which the elements are part of the real scene. The network device may process and transmit the data (which may be referred to as the XR data) generated by the XR service. For example, the network device on the cloud may render and encode (for example, source encoding) source data of the XR. The XR data is transmitted to the XR terminal by using the network device of the core network and/or the access network. The XR terminal provides the user with a diversified XR experience by processing the XR data (such as immersive experience, visual experience, interactive experience, or device experience). The XR experience has a plurality of different evaluation dimensions, such as including one or more of the following evaluation dimensions: image definition, image smoothness, image distortion, three-dimensional image, black border, image smearing, audio quality, sound effect, field angle, frame freezing, artifact, vertigo, audio and video synchronization, interactive freedom, and interactive operation response speed, interaction operation precision, interaction content loading speed, terminal wearing comfort, terminal wearing fatigue, terminal battery life, terminal portability, or terminal visual impairment friendliness, and so on.

For the transmission of the video service such as the XR, the picture frame or the tile or the slice of the picture frame may be sent to the terminal in a form of a data packet. For example, the picture frame or the tile or the slice of the picture frame is divided into an internet protocol (internet protocol, IP) packet at a network transport layer and transmitted to a fixed network/core network, and then the IP data packet is transmitted to the terminal through a wireless air interface. It may be understood that the picture frame in this application may also be referred to as a video frame or a data frame.

A characteristic of the transmission of the video frame, the video frame tile, or the video frame slice is that a plurality of data packets included in the video frame, the tile, or the slice may be considered as a whole. When a data packet is incorrectly transmitted, the entire video frame, the video frame tile, or the video frame slice is also incorrect. Generally, the correctness rate of the video frame, the video frame tile, or the video frame slice can be used for measuring user experience on the XR service. For example, user experience is generally good at a correct frame rate of 99%. The percentage of users with a specified correct frame rate can be used for measuring the cell-level XR service experience. For example, if the percentage of users with 99% correct frame rate reaches 95%, the cell-level XR service experience is good.

In a current scheduling process, proportional fair (proportional fair, PF) scheduling is usually used. That is, a scheduler calculates a proportional fair factor for the terminal based on a current data transmission rate of the terminal, a historical rate characteristic, and a quality of service class (QoS class) of the service, and schedules the terminal based on the proportional fairness factor. However, in an existing proportional fair scheduling transmission method, scheduling transmission is performed based on a criterion of maximizing system efficiency and balancing fairness of a terminal, and an integrity transmission requirement of the XR video frame, the video frame tile, or the video frame slice is not considered. As a result, the video frame accuracy rate and the user satisfaction rate of the XR service cannot meet the specified indicators. Therefore, how to design an XR service transmission method from a perspective of improving the accuracy rate of the XR video frame, the video frame tile, or the video frame slice and the satisfaction rate of cell user, to improve user experience of the XR service, which becomes an urgent problem to be solved.

An embodiment of this application provides an integrity transmission method for the transmission of the XR data. In the method, integrity transmission is performed on data or information having a synchronization requirement or having a dependency relationship, to satisfy the requirement of synchronization between the data or information, thereby improving user experience of the XR service.

In this application, the integrity transmission of the data may be understood as that two or more video frames, video frame slices, or video frame tiles are considered as a whole for the transmission. An object for which integrity is specific may have a plurality of different understandings.

For example, the object of integrity may be content (content), that is, content integrity. The content of the plurality of different dimensions has an association relationship. Therefore, the integrity transmission is performed on the plurality of data units corresponding to the content of the plurality of dimensions. For example, there is an association relationship between the plurality of data units corresponding to one picture frame content, there is an association relationship between a basic layer data unit and an enhancement layer data unit corresponding to one picture frame content, or there is an association relationship between a picture frame data unit and an audio data unit. For another example, there is an association relationship between the plurality of data units corresponding to the picture frame slice content, or there is an association relationship between a base layer data unit and an enhancement layer data unit corresponding to the picture frame slice content. For another example, there is an association relationship between the plurality of data units corresponding to the picture frame tile content, or there is an association relationship between a base layer data unit and an enhancement layer data unit corresponding to the picture frame tile content.

For another example, the object of integrity may also be a task, an event, an object, or a class, that is, task integrity, event integrity, object integrity, or class integrity. Multiple data units in the same task, the same event, the same object, or the same class have an association relationship. Therefore, the integrity transmission is performed on the plurality of data units in the same task, the same event, the same object, or the same class. For example, there is an association relationship between the plurality of data units corresponding to information such as a video, an audio, an action, and tactile in the tactile internet. For example, a data packet corresponding to video and a data packet corresponding to audio both belong to data of the tactile internet and have an association relationship.

It may be understood that the data unit in this application may be a data packet, a video frame, a video frame slice, or a video frame tile.

It may be understood that the integrity transmission and the integrity object in this application may also have other descriptions. For example, the integrity transmission may also be described as task-driven transmission, event-based transmission, object-oriented transmission, or the like, which falls within the scope of this application.

The embodiments provided in this application are applicable to a plurality of different scenarios. For example, FIG. 3 to FIG. 5 show several scenarios applicable to an embodiment of this application.

FIG. 3 shows a schematic diagram a scenario applicable to an embodiment of this application. FIG. 3 illustrates a system 300, including a server 310, a core network and access network 320 (which may be referred to as a transmission network 320 for short, such as an LTE, a 5G network, or a 6G network), and an XR terminal 330. The server 310 may be configured to code, decode, and render the source data of the XR, the transmission network 320 may be configured to transmit the XR data, and the XR terminal 330 provides diversified XR experience for the user by processing the XR data. It may be understood that another apparatus may be further included between the transmission network 320 and the XR terminal 330, for example, another terminal (for example, a mobile phone, a laptop computer, or an automobile) and/or network device may be further included (such as a relay, a Wi-Fi router, or a Wi-Fi access point). The XR terminal 330 obtains the XR data from the transmission network 320 by using the another terminal and/or network device.

FIG. 4 shows a schematic diagram a scenario applicable to another embodiment of this application. FIG. 4 illustrates a system 400, including an XR terminal 430, a core network and access network 420 (which may be referred to as a transmission network 420 for short, such as an LTE, a 5G network, or a 6G network), and another terminal 410. The another terminal 410 is a terminal other than the XR terminal 430, and the another terminal 410 may be an XR terminal or an ordinary terminal (which may also be referred to as a non-XR terminal). The another terminal 410 may transmit data to the XR terminal 430 through the transmission network 420. For example, the XR terminal 430 may be a remote management robot or a remote operator of a controlled domain in the tactile internet, and the another terminal 410 may be a tactile user and/or a manual system interface of a main domain. The another terminal 410 in the main domain transmits data to the XR terminal 430 in the controlled domain by using the transmission network 420, thereby implementing the remote management on the XR terminal 430.

Figure 5:
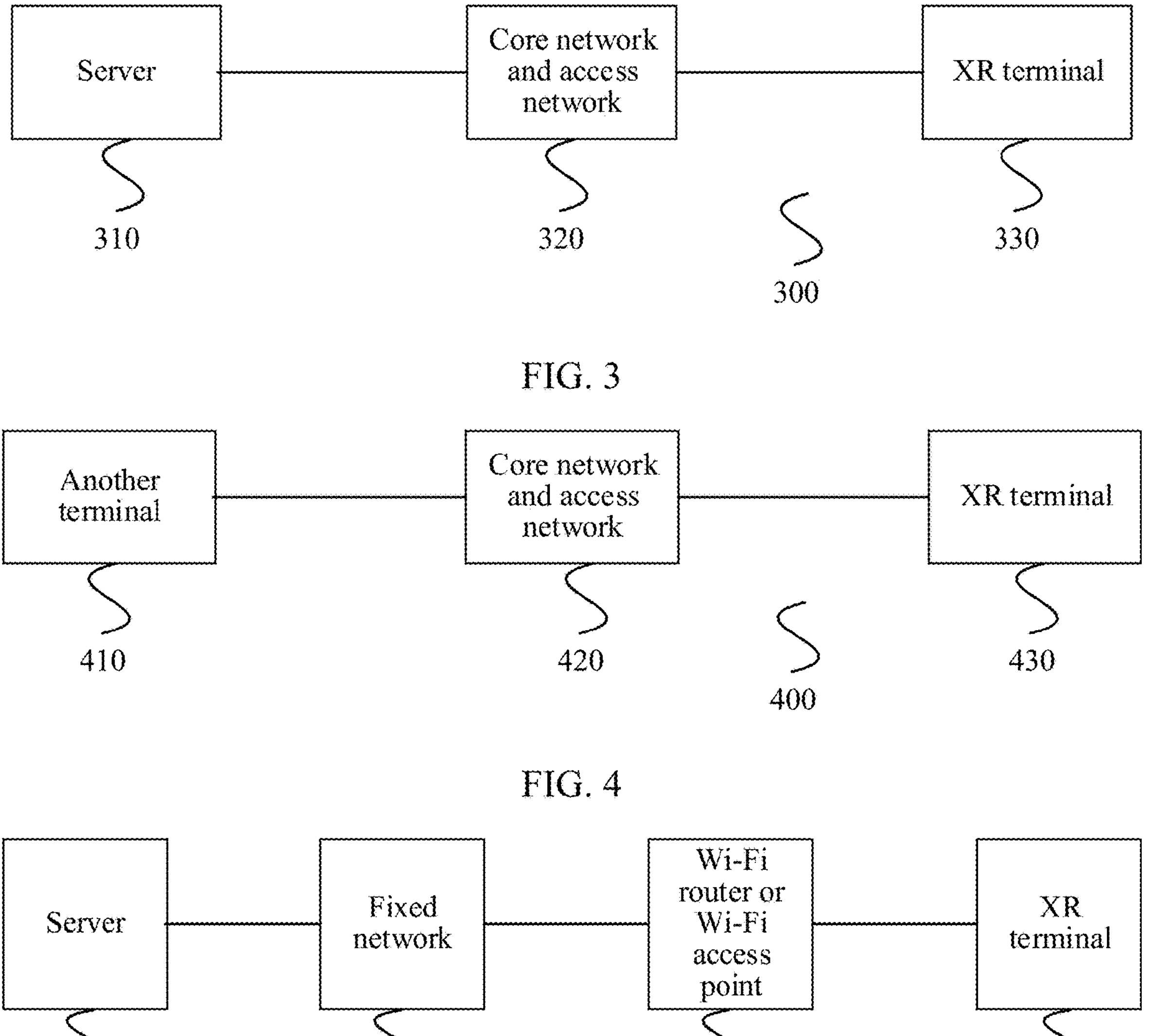

FIG. 5 shows a schematic diagram a scenario applicable to another embodiment of this application. FIG. 5 shows a system 500, including a server 510, a fixed network 520, a Wi-Fi router or a Wi-Fi access point 530 (which may be referred to as a Wi-Fi apparatus 530 for short), and an XR terminal 540. The server 510 may be configured to code, decode, and render the source data of the XR, and transmit the XR data to the XR terminal 540 by using the fixed network 520 and the Wi-Fi apparatus 530.

The technical solutions of this application are described in detail below in conjunction with specific embodiments and accompanying drawings. The following embodiments and implementations may be combined with each other. A same or similar concept or process may not be described again in some embodiments. It should be understood that functions explained in this application may be implemented by independent hardware circuitry, using software running in conjunction with a processor/microprocessor or a general-purpose computer, using an application-specific integrated circuit, and/or using one or more digital signal processors. When described as a method in this application, it may also be implemented in a computer processor and a memory coupled to the processor.

Figure 6:
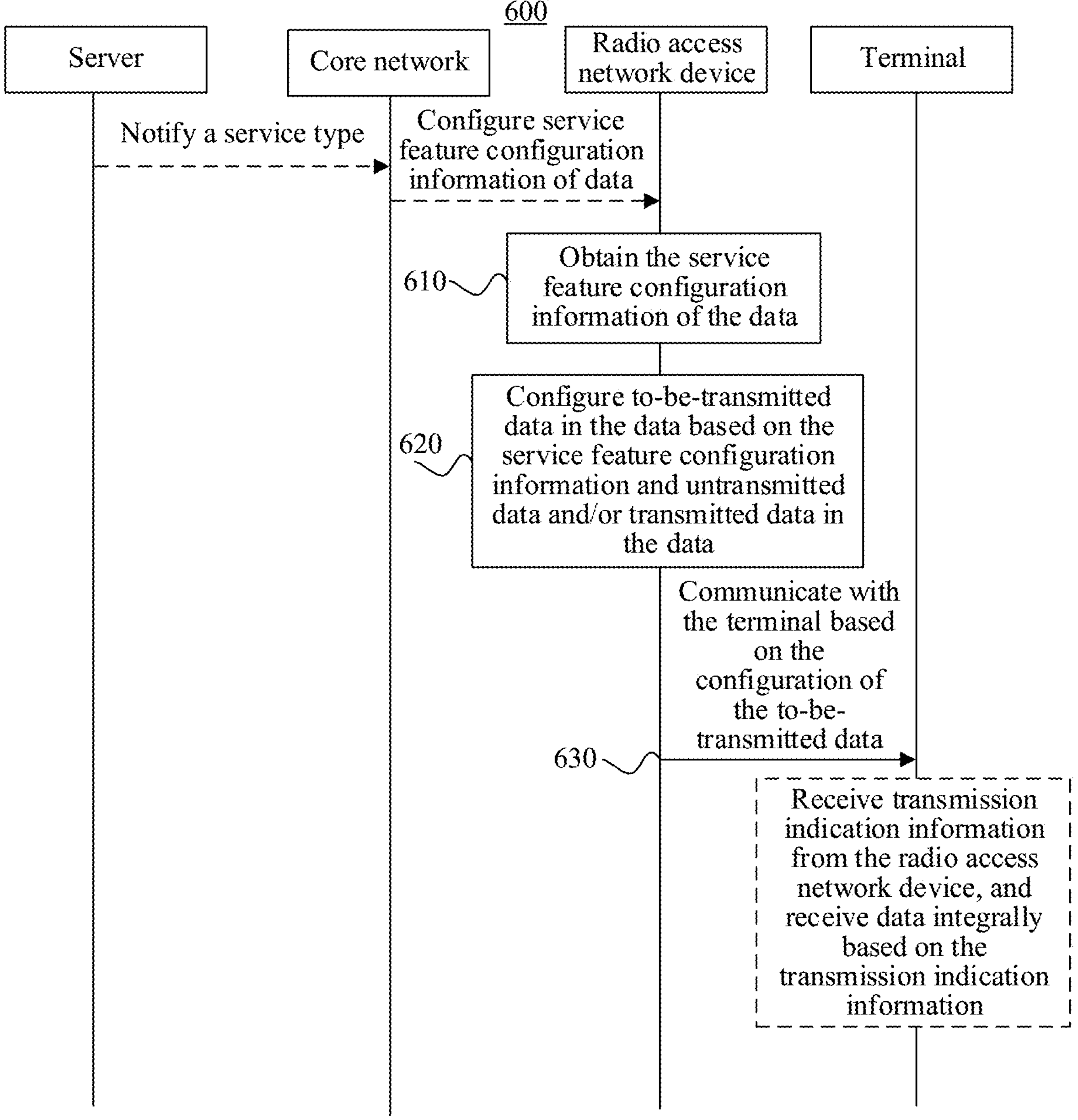
FIG. 6 is a schematic interaction diagram of a communication method according to this application.

FIG. 6 is a schematic interaction diagram of a communication method 600 according to an embodiment of this application. In FIG. 6, an example in which a server, a core network, a radio access network device, and a terminal are used as execution entities of the interaction illustration is used for illustrating the communication method. However, this application does not limit the execution entity of the interaction illustration. For example, the server in FIG. 6 may alternatively be a chip, a chip system, or a processor that supports the server in implementing the method, and the core network in FIG. 6 may alternatively be a chip, a chip system, or a processor that supports the core network in implementing the method. The radio access network device in FIG. 6 may alternatively be a chip, a chip system, or a processor that supports the radio access network device in implementing the method, or the terminal in FIG. 6 may alternatively be a chip, a chip system, or a processor that supports the terminal in implementing the method. The method 600 shown in FIG. 6 includes part 610 to part 640. By using the method, the integrity transmission can be performed on data or information that has a synchronization requirement or a dependency relationship, to meet a synchronization demand between data or information, thereby improving user experience of the XR service. The method 600 provided in this embodiment of this application is described below.

Part 610: The radio access network device obtains service feature configuration information of data. Optionally, the foregoing data corresponds to data of one picture frame, data of a same slice in the picture frame, or data of a same tile in the picture frame. The foregoing video frame slice or video frame tile means that a video frame may be encoded based on area division during encoding, and the divided area is referred to as a video frame slice or a video frame slice. In this manner, the radio access network device may identify the XR service type and the integrity transmission requirement of the XR service. It may be understood that a specific name of the integrity transmission requirement is not limited in this embodiment of this application. The integrity transmission requirement is merely a possible name. Any other requirement name that can reflect the foregoing functions should be understood as the integrity transmission requirement in the solutions of this application. When the data has the foregoing integrity transmission requirement, data information included in the data is subsequently transmitted on a radio access network device side as a whole, so that integrity transmission of the data on the radio access network device is supported, and user experience of the XR service is improved.

In a possible implementation of part 610, the service feature configuration information may be configured by the core network element (for example, an SMF network element) for the radio access network device. The radio access network device obtains the service feature configuration information based on a configuration of a core network element. Optionally, the core network obtains, by using a notification from the server, the service type for data transmission. For example, the server notifies the core network that the current service type is an XR service. In this manner, the radio access network device may identify and receive the service feature configuration information corresponding to the foregoing data.

In a possible implementation of the service feature configuration information, the service feature configuration information indicates service type information and/or integrity information of the data. The service type information indicates a service type (for example, the XR service) to which the data belongs. The integrity information may indicate one or more of the following: whether a plurality of data packets belong to a whole; whether the plurality of data packets need to be transmitted as a whole; frame information, frame tile information, or frame slice information of the plurality of data packets; and information about a data volume size of the frame, the frame tile, or the frame slice to which the plurality of data packets belong, for example, information about a data size or a quantity of data packets. In this implementation, the radio access network device may identify the XR service type, and may allow data of the same picture frame, data of the same slice, or data of the same tile to be considered as a whole for transmission, thereby improving user experience on the video picture.

In a possible implementation of the service feature configuration information, the service feature configuration information includes one or more of 5G quality of service identifier (5G quality identity, 5QI) information, quality of service flow identifier (QoS flow identifier, QFI) information, quality of service profile (QoS profile) information, bearer information, or general packet radio service tunneling protocol (general packet radio service tunneling protocol, GTP) information, which is used for indicating the service type information and/or the integrity information of the data. In this implementation, the service feature configuration information can be received and identified, so that integrity transmission of data in the radio access network device is supported, and user experience of the XR service is improved.

For example, the service type information indicated by the service feature configuration information may be carried by using a service type information attribute in the 5QI information, the QFI information, the quality of service profile information, or the GTP information. Alternatively, the core network may be implemented by configuring the corresponding bearer information, the 5QI information, or the QFI information for a corresponding service.

As shown in Table 1, the core network may configure corresponding bearer information for the corresponding service. In the example in Table 1, a bearer 1, a bearer 2, and a bearer 3 respectively correspond to a voice service, a video service, and an XR service.

TABLE 1

| Bearer | Service Type |
| --- | --- |
| Bearer 1 | Voice service |
| Bearer 2 | Video service |
| Bearer 3 | XR service |

As shown in Table 2, the core network may configure a corresponding 5QI for the corresponding service. In an example in Table 2, 5QI1, 5QI2, and 5QI3 respectively correspond to the voice service, the video service, and the XR service.

TABLE 2

| 5QI | Service Type |
|---|---|
| 5QI1 | Voice service |
| 5QI2 | Video service |
| 5QI3 | XR service |

As shown in Table 3, the core network may configure a corresponding QFI for the corresponding service. In the example in Table 3, the QFI1, the QFI2, and the QFI3 are respectively corresponding to the voice service, the video service, and the XR service.

TABLE 3

| QFI | Service Type |
|---|---|
| QFI1 | Voice service |
| QFI2 | Video service |
| QFI3 | XR service |

In the foregoing manner, the radio access network device may obtain the service type information of the service corresponding to the data.

For another example, the integrity information indicated by the service feature configuration information may be carried by using an integrity information attribute in the 5QI information, the QFI information, the quality of service profile information, or the GTP information. Alternatively, the core network may configure the corresponding bearer information, the 5QI information, or the QFI information for the integrity information attribute.

As shown in Table 4, the core network may configure corresponding bearer information for the integrity information attribute. In the example in Table 4, the bearer 4 and the bearer 5 respectively correspond to requiring the integrity transmission and not requiring the integrity transmission.

TABLE 4

| Bearer | Integrity information attribute (whether integrity transmission is required) |
|---|---|
| Bearer 4 | Yes |
| Bearer 5 | No |

As shown in Table 5, the core network may configure a corresponding 5QI for the integrity information attribute. In the example in Table 5, the 5QI4 and the bearer 5QI5 respectively correspond to requiring the integrity transmission and not requiring the integrity transmission.

TABLE 5

| 5QI | Integrity information attribute (whether integrity transmission is required) |
|---|---|
| 5QI4 | Yes |
| 5QI5 | No |

As shown in Table 6, the core network may configure a corresponding QFI for the integrity information attribute. In the example in Table 6, the QFI4 and the bearer QFI5 are respectively corresponding to requiring the integrity transmission and not requiring the integrity transmission.

TABLE 6

| QFI value | Integrity information attribute (whether integrity transmission is required) |
|---|---|
| QFI4 | Yes |
| QFI5 | No |

In this manner, the radio access network device may obtain the integrity information of the service corresponding to the foregoing data.

In another possible implementation of part 610, the service feature configuration information of the data is determined by sensing a data volume and a period of the data. For example, when it is perceived that the data arrives periodically and the data volume is greater than the first threshold (for example, when the data volume is greater than 1 Mbit), it may be determined that the service type of the data is the XR service type.

Part 620: The radio access network device configures to-be-transmitted data in the data based on the service feature configuration information and untransmitted data and/or transmitted data in the data. In this manner, the integrity transmission is performed on XR data, thereby improving an XR video frame transmission accuracy rate and an overall user satisfaction rate of a cell, and improving user experience of an XR service.

In a possible implementation of part 620, the radio access network device sets a priority of the to-be-transmitted data based on the untransmitted data and/or the transmitted data. In this implementation, the priority of the data transmission may be optimized based on a correlation between the video frame, the video slice, or the video tile, to improve user experience on the XR data.

In a possible implementation of the priority setting, a correspondence exists between a priority factor set for the data packet of the to-be-transmitted data and the transmitted data volume sent data and the untransmitted data volume remaining data of a currently transmitted video frame. For example, the correspondence satisfies function $f1$:

$$\text{factor} = f1\left(\frac{\text{sent data}}{\text{all data}}\right)$$

where all data represents a total data volume of the currently transmitted video frames, that is, all data=sent data+remaining data. It may be understood that the data volume in this application may be a quantity of data packets or other data volume parameters. For example, $f1$ meets the following requirements:

$$\text{factor} = \alpha \times \left(\frac{\text{sent data}}{\text{all data}}\right)$$

That is to say, there is a linear proportional relationship between a priority factor set for a data packet of the to-be-transmitted data and a ratio of a transmitted data volume sent data of the currently transmitted video frame to a total data volume all data, where is a a non-zero real number.

In another possible implementation of the priority setting, there is a correspondence between a priority factor set for the data packet of the to-be-transmitted data and a transmitted data volume of the currently transmitted video frame. For example, the correspondence satisfies function $f2$:

$$\text{factor} = f2(\text{sent data})$$

For example, $f2$ meets the following requirements:

$$\text{factor}=\alpha\times(\text{sent data})$$

That is to say, there is a linear proportional relationship between the priority factor set for the data packet of the to-be-transmitted data and the transmitted data volume of the currently transmitted video frame.

In another possible implementation of the priority setting, there is a correspondence between a priority factor set for the data packet of the to-be-transmitted data and an untransmitted data volume of the currently transmitted video frame. For example, the correspondence satisfies function $f3$:

$$\text{factor}=f3(\text{remaining data})$$

For example, $f3$ meets the following requirements:

$$\text{factor}=\alpha\times(\text{remaining data})$$

That is to say, there is a linear proportional relationship between a priority factor set for the data packet of the to-be-transmitted data and an untransmitted data volume of the currently transmitted video frame.

Optionally, in the foregoing priority setting manner, in addition to the untransmitted data and/or the transmitted data, other factors may be additionally considered when the priority setting is performed for the to-be-transmitted data. In a possible implementation, the radio access network device sets a priority for the to-be-transmitted data based on a data volume of the untransmitted data and/or a data volume of the transmitted data, and based on one or more of a transmission delay of the transmitted data, an estimated transmission delay of the untransmitted data, a correct receiving rate of the transmitted data, an instantaneous transmission rate, or a historical transmission rate. In this implementation, the priority of the data transmission may be optimized based on a correlation between the video frame, the video slice, or the video tile, to improve user experience on the XR data.

In a possible implementation of the priority setting, there is a correspondence between the priority factor set for the data packet of the to-be-transmitted data and the transmitted data volume of the currently transmitted video frame, the untransmitted data volume, and the estimated transmission delay of the remaining data of the currently transmitted video frame. For example, the correspondence satisfies function $f4$:

$$\text{factor} = f4\left(\frac{\text{sent data}}{\text{all data}}, \text{delay}\right)$$

where delay represents a transmission delay of the currently transmitted video frame or may be an estimated transmission delay of the remaining data of the currently transmitted video frame, for example, satisfying a function relationship:

$$\text{delay} = f5\left(\frac{\text{remaining data}}{R_{his}}\right),$$

where R_his his represents a historical rate of a current user or a historical rate of a frame currently transmitted by the current user. For example, $f5$ meets the following requirements:

$$\text{delay} = \mu\times\left(\frac{\text{remaining data}}{\text{R\_his}}\right),$$

that is to say, the transmission delay of the currently transmitted video frame or the estimated transmission delay of the remaining data of the currently transmitted video frame is a linear function of a ratio of the untransmitted data volume remaining data of the currently transmitted video frame to the historical rate of the currently transmitted frame of the current user, where $\mu$ is a nonzero real number.

For example, $f4$ meets the following requirements:

$$\text{factor} = \alpha\times\left(\frac{\text{sent data}}{\text{all data}}\right) + \beta\times\text{delay}$$

That is, there is a linear proportional relationship between a priority factor set for the data packet of the to-be-transmitted data, a ratio of the transmitted data volume sent data of the currently transmitted video frame to a total data volume all data, and a delay of the currently transmitted video frame, where $\beta$ is a non-zero real number.

In a possible implementation of the priority setting, there is a correspondence between the priority factor set for the data packet of the to-be-transmitted data and the transmitted data volume of the currently transmitted video frame, the untransmitted data volume, the estimated transmission delay of the remaining data of the currently transmitted video frame, and a historical correct frame rate acquired by the radio access network device side. For example, the correspondence satisfies function $f6$:

$$\text{factor} = f6\left(\frac{\text{sent data}}{\text{all data}}, \text{delay}, FTR\right)$$

where FTR represents the historical correct frame rate acquired by the radio access network device side.

For example, $f6$ meets the following requirements:

$$\text{factor} = \alpha\times\left(\frac{\text{sent data}}{\text{all data}}\right) + \beta\times\text{delay} + \gamma\times FTR$$

That is to say, there is a linear proportional relationship between the priority factor set for the data packet of the to-be-transmitted data, the ratio of the transmitted data volume sent data of the currently transmitted video frame to a total data volume all data, the delay of the currently transmitted video frame, and the historical correct frame rate, where $\gamma$ is a non-zero real number.

In a possible implementation of the priority setting, there is a correspondence between the priority factor set for the data packet of the to-be-transmitted data and the transmitted data volume of the currently transmitted video frame, the untransmitted data volume, the estimated transmission delay of the remaining data of the currently transmitted video frame, the historical correct frame rate acquired by the radio access network device side, and the instantaneous transmission rate of the current user. For example, the correspondence satisfies function $f7$:

$$\text{factor} = f7\left(\frac{\text{sent data}}{\text{all data}}, \text{delay}, FTR, \text{R\_ins}\right)$$

where R_ins represents an instantaneous rate of a currently scheduled user at the current moment.

For example, ƒ7 meets the following requirements:

$$\text{factor} = \alpha \times \left(\frac{\text{sent data}}{\text{all data}}\right) + \beta \times \text{delay} + \gamma \times FTR + \delta \times \text{R\_ins}$$

That is to say, there is a linear proportional relationship between the priority factor set for the data packet of the to-be-transmitted data, the ratio of the transmitted data volume sent data of the currently transmitted video frame to a total data volume all data, the delay of the currently transmitted video frame, the historical correct frame rate, and the instantaneous rate of the currently scheduled user, where δ is a nonzero real number.

In a possible implementation of the priority setting, there is a correspondence between the priority factor set for the data packet of the to-be-transmitted data and the transmitted data volume of the currently transmitted video frame, the untransmitted data volume, the estimated transmission delay of the remaining data of the currently transmitted video frame, the historical correct frame rate acquired by the radio access network device side, the instantaneous transmission rate of the current user, and the historical transmission rate. For example, the correspondence satisfies function ƒ8:

$$\text{factor} = f8\left(\frac{\text{sent data}}{\text{all data}}, \text{delay}, FTR, \text{R\_ins}, \text{R\_his}\right)$$

where R_his represents a historical rate of a current user or a historical rate of a frame currently transmitted by the current user.

For example, ƒ8 meets the following requirements:

$$\text{factor} = \alpha \times \left(\frac{\text{sent data}}{\text{all data}}\right) + \beta \times \text{delay} + \gamma \times FTR + \delta \times \text{R\_ins} + \varepsilon \times \text{R\_his}$$

That is to say, there is a linear proportional relationship between the priority factor set for the data packet of the to-be-transmitted data, the ratio of the transmitted data volume sent data of the currently transmitted video frame to a total data volume all data, the delay of the currently transmitted video frame, the historical correct frame rate, the instantaneous rate of the currently scheduled use, and the historical rate of the current user or the historical rate of the current transmission frame of the current user, where ε is a non-zero real number.

In a possible implementation of the priority setting, there is a correspondence between the priority factor set for the data packet of the to-be-transmitted data and the transmitted data volume, the untransmitted data volume, the instantaneous transmission rate of the current user, and the historical transmission rate of the currently transmitted video frame. For example, the correspondence satisfies function ƒ9:

$$\text{factor} = f9\left(\frac{\text{sent data}}{\text{all data}}, \text{R\_ins}, \text{R\_his}\right).$$

For example, ƒ9 meets the following requirements:

$$\text{factor} = \alpha \times \left(\frac{\text{sent data}}{\text{all data}}\right) + \beta \times \text{R\_ins} + \gamma \times \text{R\_his}$$

That is to say, there is a linear proportional relationship between the priority factor set for the data packet of the to-be-transmitted data, the ratio of the transmitted data volume sent data of the currently transmitted video frame to a total data volume all data, the delay of the currently transmitted video frame, the delay, the historical correct frame rate, the instantaneous rate of the currently scheduled use, and the historical rate of the current user or the historical rate of the current transmission frame of the current user.

In a possible implementation of the priority setting, there is a correspondence between the priority factor set for the data packet of the to-be-transmitted data and the transmitted data volume of the currently transmitted video frame, the untransmitted data volume, the estimated transmission delay of the remaining data of the currently transmitted video frame, the instantaneous transmission rate of the current user, and the historical transmission rate. For example, the correspondence satisfies function ƒ10:

$$\text{factor} = f10\left(\frac{\text{sent data}}{\text{all data}}, \text{delay}, \text{R\_ins}, \text{R\_his}\right)$$

For example, ƒ10 meets the following requirements:

$$\text{factor} = \alpha \times \left(\frac{\text{sent data}}{\text{all data}}\right) + \beta \times \text{delay} + \gamma \times \text{R\_ins} + \delta \times \text{R\_his}$$

That is to say, there is a linear proportional relationship between the priority factor set for the data packet of the to-be-transmitted data, the ratio of the transmitted data volume sent data of the currently transmitted video frame to a total data volume all data, the delay of the currently transmitted video frame, the instantaneous rate of the currently scheduled use, and the historical rate of the current user or the historical rate of the current transmission frame of the current user.

In a possible implementation of the priority setting, there is a correspondence between the priority factor set for the data packet of the to-be-transmitted data and the transmitted data volume of the currently transmitted video frame and the estimated transmission delay of the remaining data of the currently transmitted video frame. For example, the correspondence satisfies function ƒ11:

$$\text{factor} = f11(\text{sent data}, \text{delay})$$

For example, ƒ11 meets the following requirements:

$$\text{factor} = \alpha \times \text{sent data} + 3 \times \text{delay}$$

That is to say, there is a linear proportional relationship between the priority factor set for the data packet of the to-be-transmitted data, the transmitted data volume sent data of the currently transmitted video frame, and the delay of the currently transmitted video frame.

In a possible implementation of the priority setting, there is a correspondence between the priority factor set for the data packet of the to-be-transmitted data and the transmitted data volume of the currently transmitted video frame, the instantaneous transmission rate of the current user, and the historical transmission rate. For example, the correspondence satisfies function $f12$:

$$factor=f12(sent\ data, R\_ins, R\_his)$$

For example, $f12$ meets the following requirements:

$$factor=\alpha\times sent\ data+\beta\times R\_ins+\gamma\times R\_his$$

That is to say, there is a linear proportional relationship between the priority factor set for the data packet of the to-be-transmitted data and the sent data volume of the currently transmitted video frame, the instantaneous rate of the currently scheduled user, and the historical rate of the current user or the historical rate of the current transmission frame of the current user.

In a possible implementation of the priority setting, there is a correspondence between the priority factor set for the data packet of the to-be-transmitted data and the transmitted data volume of the currently transmitted video frame, the estimated transmission delay of the remaining data of the currently transmitted video frame, and the instantaneous transmission rate of the current user. For example, the correspondence satisfies function $f13$:

$$factor=f13(sent\ data, delay, R\_ins)$$

For example, $f13$ meets the following requirements:

$$factor=\alpha\times sent\ data+\beta\times delay+\gamma\times R\_ins$$

That is to say, there is a linear proportional relationship between the priority factor set for the data packet of to-be-transmitted data and the transmitted data volume sent data of the currently transmitted video frame, the delay of the currently transmitted video frame, and the instantaneous rate of the currently scheduled user.

In a possible implementation of the priority setting, there is a correspondence between the priority factor set for the data packet of the to-be-transmitted data and the transmitted data volume of the currently transmitted video frame, the estimated transmission delay of the remaining data of the currently transmitted video frame, the instantaneous transmission rate of the current user, and the historical transmission rate. For example, the correspondence satisfies function $f14$:

$$factor=f14(sent\ data, delay, R\_ins, R\_his)$$

For example, $f14$ meets the following requirements:

$$factor=\alpha\times sent\ data+\beta\times delay+\gamma\times R\_ins+6\times R\_his$$

That is to say, there is a linear proportional relationship between the priority factor set for the data packet of the to-be-transmitted data and the sent data volume of the currently transmitted video frame, the delay of the currently transmitted video frame, the instantaneous rate of the currently scheduled user, and the historical rate of the current user or the historical rate of the current transmission frame of the current user.

In another possible implementation of part 620, the radio access network device sets a priority based on the estimated transmission delay of the remaining data of the currently transmitted video frame. In this implementation, the priority of the data transmission may be optimized based on a correlation between the video frame, the video slice, or the video tile, to improve user experience on the XR data. If the estimated transmission delay of the remaining data of the currently transmitted video frame is longer, the scheduling priority is relatively higher, that is, a proportion of the factor d in determining the scheduling priority increases. The scheduling priority factor of the current user data packet is a single increasing function for estimating the remaining transmission delay. In this manner, when resources are relatively unrestricted, a user with a relatively poor guaranteed channel can be served to implement the integrity transmission as soon as possible (in this case, a scheduling opportunity of a user with better channels is sacrificed), to achieve an objective of improving a user frame transmission accuracy rate and an overall user satisfaction rate.

In a possible implementation of the priority setting, there is a correspondence between the priority factor set for the data packet of the to-be-transmitted data and the estimated transmission delay of the remaining data of the currently transmitted video frame. For example, the correspondence satisfies function $f15$:

$$factor=f15(delay)$$

For example, $f15$ meets the following requirements:

$$factor=\alpha\times delay$$

That is to say, there is a linear proportional relationship between the priority factor set for the data packet of the to-be-transmitted data and the delay of the currently transmitted video frame.

Optionally, in the foregoing priority setting manner, in addition to the estimated transmission delay of the remaining data of the currently transmitted video frame, other factors may be additionally considered when the priority setting is performed for the to-be-transmitted data. In a possible implementation, the radio access network device sets a priority for the to-be-transmitted data based on one or more of the estimated transmission delay of the remaining data of the currently transmitted video frame, the instantaneous transmission rate of the current user, and the historical transmission rate. In this implementation, the priority of the data transmission may be optimized based on a correlation between the video frame, the video slice, or the video tile, to improve user experience on the XR data.

In a possible implementation of the priority setting, there is a correspondence between the priority factor set for the data packet of the to-be-transmitted data and the estimated transmission delay of the remaining data of the currently transmitted video frame and the instantaneous transmission rate of the current user. For example, the correspondence satisfies function $f16$:

$$factor=f16(delay, R\_ins)$$

For example, $f16$ meets the following requirements:

$$factor=\alpha\times delay+\beta\times R\_ins$$

That is to say, there is a linear proportional relationship between the priority factor set for the data packet of the to-be-transmitted data, the delay of the currently transmitted video frame, and the instantaneous rate of the currently scheduled user.

In a possible implementation of the priority setting, there is a correspondence between the priority factor set for the data packet of the to-be-transmitted data and the estimated transmission delay of the remaining data of the currently transmitted video frame, the instantaneous transmission rate of the current user, and the historical transmission rate. For example, the correspondence satisfies function $f17$:

$$factor=f17(delay, R\_ins, R\_his)$$

For example, $f17$ meets the following requirements:

$$factor=\alpha\times delay+\beta\times R\_ins+\gamma\times R\_his$$

That is to say, there is a linear proportional relationship between the priority factor set for the data packet of the to-be-transmitted data and the delay of the current transmission video frame, the instantaneous rate of the currently scheduled user, and the historical rate of the current user or the historical rate of the current transmission frame of the current user.

In another possible implementation of part 620, the radio access network device does not send the data unit of the to-be-transmitted data based on the untransmitted data and/or the transmitted data. In this implementation, data transmission that does not contribute to the XR data experience can be reduced, thereby reducing a waste of transmission resources and improving utilization efficiency of transmission resources.

In a possible implementation of skipping sending a data unit of the to-be-transmitted data, when the transmitted data is incorrectly transmitted, or when an estimated transmission time period of the untransmitted data is greater than a transmission time period threshold, or when the correct receiving rate of the transmitted data is less than a correct receiving rate threshold, the radio access network device skips send the data unit of the to-be-transmitted data. In this implementation, data transmission that does not contribute to the XR data experience can be reduced, thereby reducing a waste of transmission resources and improving utilization efficiency of transmission resources.

For example, if the radio access network device determines, based on the feedback information of the terminal, that a data packet of a video frame is in a transmission error state (for example, the transmission fails when the maximum number of retransmissions is reached), the radio access network device skips send the remaining data packet corresponding to the erroneous video frame, thereby reducing data transmission that does not contribute to the XR data experience, reducing a waste of the transmission resources, and improving the utilization efficiency of the transmission resources.

For another example, the radio access network device estimates a remaining data packet transmission time period of the current video frame based on a statistical historical rate. If the estimated remaining data packet transmission time period of the current video frame is greater than a given time threshold, the radio access network device skips send the remaining data packet of the erroneous video frame, thereby reducing data transmission that does not contribute to the XR data experience, reducing a waste of the transmission resources, and improving the utilization efficiency of the transmission resources.

For another example, the radio access network device determines, based on the statistical historical correct frame rate, whether the historical correct frame rate of the current user is less than a given threshold (such as 50%). If the value is less than the given threshold, the radio access network device skips send the remaining data packet of the erroneous video frame, thereby reducing data transmission that does not contribute to the XR data experience, reducing a waste of the transmission resources, and improving the utilization efficiency of the transmission resources. Optionally, the correct frame rate of the service may be used as a reference, and if the reference is less than a specific threshold, the remaining data packet of the service is not sent. Alternatively, the correct frame rate may be periodically determined, and if the correct frame rate is less than a specific threshold, a remaining data packet of the service is not sent.

Part 630: The radio access network device communicates with the terminal based on the configuration of the to-be-transmitted data.

In a possible implementation of part 630, that the radio access network device communicates with the terminal based on the configuration of the to-be-transmitted data includes: sending the to-be-transmitted data to the terminal based on the configuration of the to-be-transmitted data. For example, the radio access network device sends the to-be-transmitted data to the terminal by using a data channel based on the configuration of the to-be-transmitted data. For another example, the radio access network device sends, by using a control channel, a configuration parameter or control information related to the to-be-transmitted data to the terminal. In this manner, the terminal may identify and receive the XR service data from the radio access network device.

In a possible implementation of part 630, that the radio access network device communicates with the terminal based on the configuration of the to-be-transmitted data includes: sending transmission indication information of the to-be-transmitted data to the terminal, where the transmission indication information is used for processing the transmitted data. Optionally, the transmission indication information is used for indicating an integrity transmission criterion of the data, a quantity of data packets included in the to-be-transmitted data, and a data unit to which the data packet of the to-be-transmitted data belongs. Optionally, the transmission indication information is used for indicating a data unit to which a to-be-transmitted data packet that is not sent belongs.

The transmission indication information may be carried in a radio resource control (radio resource control, RRC) message, downlink control information (downlink control information, DCI), or a media access control control element (media access control control element, MAC CE). For example, the radio access network device notifies, by using the RRC message, the terminal of the integrity transmission criterion of the current service, the quantity of data packets included in the to-be-transmitted data, a data unit to which the data packet of the to-be-transmitted data belongs, and a data unit to which the to-be-transmitted data packet that is not sent belongs. For another example, the radio access network device notifies the terminal of the integrity transmission criterion of a current service by using the RRC message, and indicates, by using the DCI or the MAC CE, a quantity of data packets included in the to-be-transmitted data, a data unit to which a data packet of the to-be-transmitted data belongs, and a data unit to which the to-be-transmitted data packet that is not sent belongs. For another example, the radio access network device indicates, by using the DCI or the MAC CE, an integrity transmission criterion, a quantity of data packets included in to-be-transmitted data, a data unit to which a data packet of to-be-transmitted data belongs, and a data unit to which a to-be-transmitted data packet that is not sent belongs. In this manner, the integrity transmission criterion of the current service, the quantity of data packets included in the to-be-transmitted data, the data unit to which the data packet of the to-be-transmitted data belongs, and the data unit to which the to-be-transmitted data packet that is not sent belongs are indicated, to support an integrity transmission requirement of the XR video frame and improve user experience of the XR service.

In a possible implementation of part 630, the terminal receives the transmission indication information from the radio access network device, and receives integrity of the data based on the transmission indication information. In this manner, the integrity receiving can be performed based on a service characteristic of the XR video service, and the correct rate of the XR data packet and the satisfaction rate of the cell user can be improved, thereby improving user experience of the XR service.

In a possible implementation of receiving the integrity of the data based on the transmission indication information, the terminal determines, based on the received data packet of the current frame, that if an incorrectly received data packet exists, the terminal clears the data packet of the current received frame, including the data packet that is successfully decoded and the data packet that fails to be decoded. In this manner, all or some data packets of the video frame in which an error occurs are cleared, so that data transmission that does not contribute to XR data experience can be reduced, thereby reducing a waste of transmission resources and improving utilization efficiency of transmission resources.

In another possible implementation of receiving the integrity of the data based on the transmission indication information, when it is learned that, by using the transmission indication information, the radio access network device has a packet loss case, the terminal clears all the data packet of the current received frame, including the data packet that is successfully decoded and the data packet that fails to be decoded. In this manner, all or some data packets of the video frame in which an error occurs are cleared, so that data transmission that does not contribute to XR data experience can be reduced, thereby reducing a waste of transmission resources and improving utilization efficiency of transmission resources.

Figure 7:
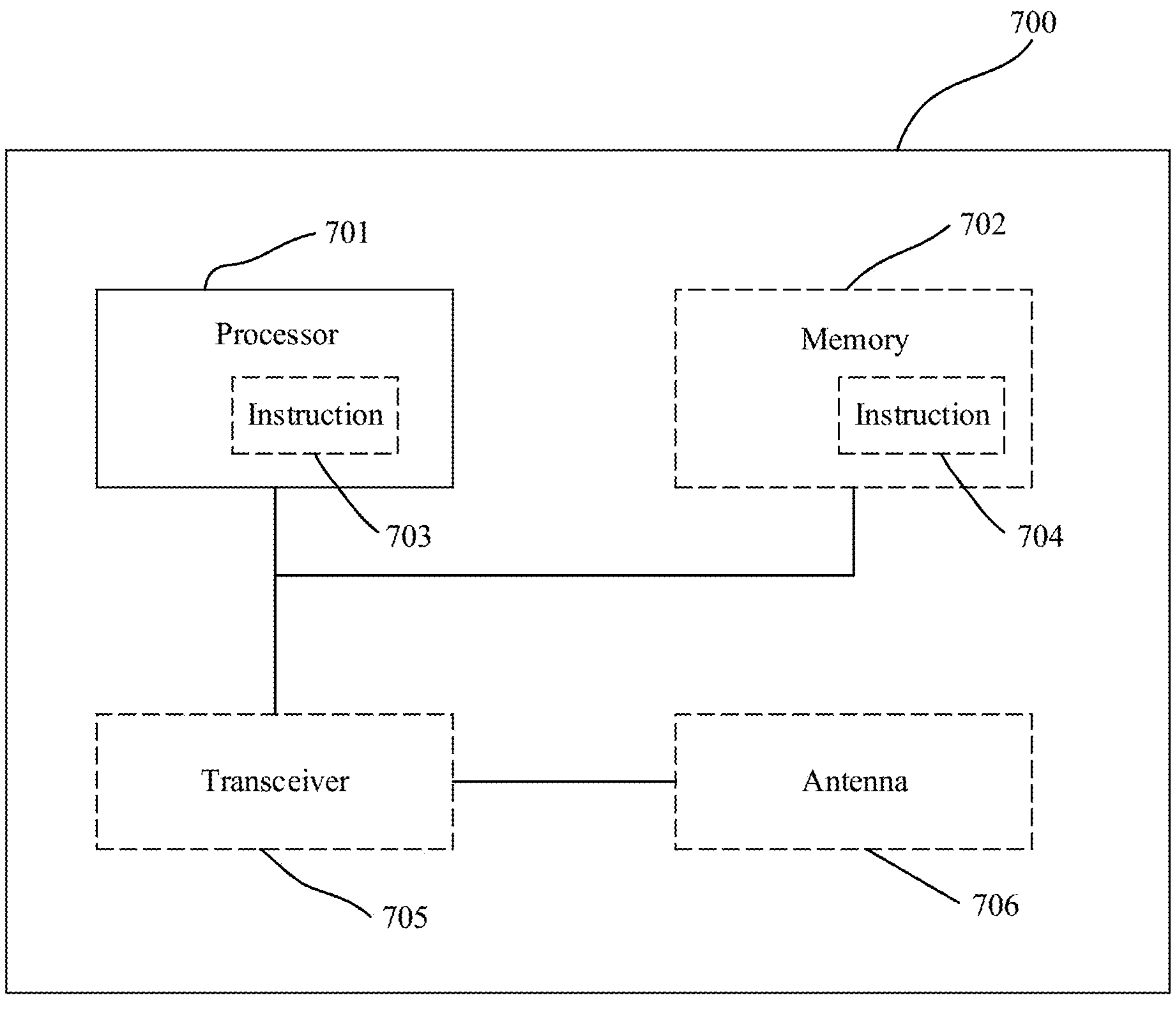
FIG. 7 is a schematic structural diagram of a communication apparatus according to an embodiment of this application.

FIG. 7 shows a schematic structural diagram of an apparatus. The apparatus 700 may be a network device; may be a terminal device; may be a chip, a chip system, a processor, or the like that supports a network device in implementing the foregoing method; or may be a chip, a chip system, a processor, or the like that supports the terminal device in implementing the foregoing method. The apparatus may be configured to implement the method described in the foregoing method embodiment. For details, refer to the description in the foregoing method embodiment.

The apparatus 700 may include one or more processors 701. The processor 701 may also be referred to as a processing unit, and may implement a specific control function. The processor 701 may be a general purpose processor or a special purpose processor or the like. For example, the processor may be a baseband processor or a central processing unit. The baseband processor may be configured to process a communication protocol and communication data, and the central processing unit may be configured to process a communication apparatus (for example, a base station, a baseband chip, a terminal, a terminal chip, a DU, or a CU), execute a software program, and process data of the software program.

In an optional design, the processor 701 may alternatively store instructions and/or data 703, and the instructions and/or data 703 may be run by the processor, so that the apparatus 700 performs the method described in the foregoing method embodiment.

In another optional design, the processor 701 may include a transceiver unit configured to implement functions of reception and transmission. For example, the transceiver unit may be a transceiver circuit, an interface, or an interface circuit. The transceiver circuit, the interface, or the interface circuit that are configured to implement the functions of reception and transmission may be separated, or may be integrated together. The transceiver circuit, the interface, or the interface circuit may be configured to read or write code/data, or the transceiver circuit, the interface, or the interface circuit may be configured to transmit or transmit a signal.

In still another possible design, the apparatus 700 may include a circuit, and the circuit may implement the functions of reception, transmission, and communication in the foregoing method embodiment.

Optionally, the apparatus 700 may include one or more memories 702. The memory may store instructions 704, and the instructions may be run on the processor, so that the apparatus 700 performs the method described in the foregoing method embodiment. Optionally, the memory may further store data. Optionally, the processor may also store instructions and/or data. The processor and the memory may be separately arranged, or may be integrated together. For example, the correspondence described in the foregoing method embodiment may be stored in the memory or stored in the processor.

Optionally, the apparatus 700 may further include a transceiver 705 and/or an antenna 706. The processor 701 may be referred to as a processing unit, and configured to control the apparatus 700. The transceiver 705 may be referred to as a transceiver unit, a transceiver machine, a transceiver circuit, a transceiver apparatus, a transceiver module, or the like, and is configured to implement a sending/receiving function.

Optionally, the apparatus 700 in this embodiment of this application may be configured to perform the method described in FIG. 6 in this embodiment of this application.

The processor and the transceiver described in this application may be implemented on an integrated circuit (integrated circuit, IC), an analog IC, a radio frequency integrated circuit RFIC, a hybrid signal IC, an application-specific integrated circuit (application specific integrated circuit, ASIC), a printed circuit board (printed circuit board, PCB), an electronic device, or the like. The processor and the transceiver each may be manufactured by using various IC processing technologies, for example, a complementary metal oxide semiconductor (complementary metal oxide semiconductor, CMOS), an n-type metal oxide semiconductor (n Metal-oxide-semiconductor, NMOS), a p-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 7. The apparatus may be a stand-alone device or may be part of a larger device. For example, the apparatus may be:

(1) an independent IC, a chip, a chip system, or a subsystem;

(2) a set having one or more ICs. Optionally, the IC set may also include a storage component configured to store data and/or instructions;

(3) an ASIC, such as a modem (MSM);

(4) a module that can be embedded in other devices;

(5) a receiver, a terminal, an intelligent terminal, a cellular phone, a wireless device, a handset, a mobile unit, an on-board device, a network device, a cloud device, an artificial intelligence device, a machine device, a household device, a medical device, an industrial device, and the like; and (6) others, and so on.

Figure 8:
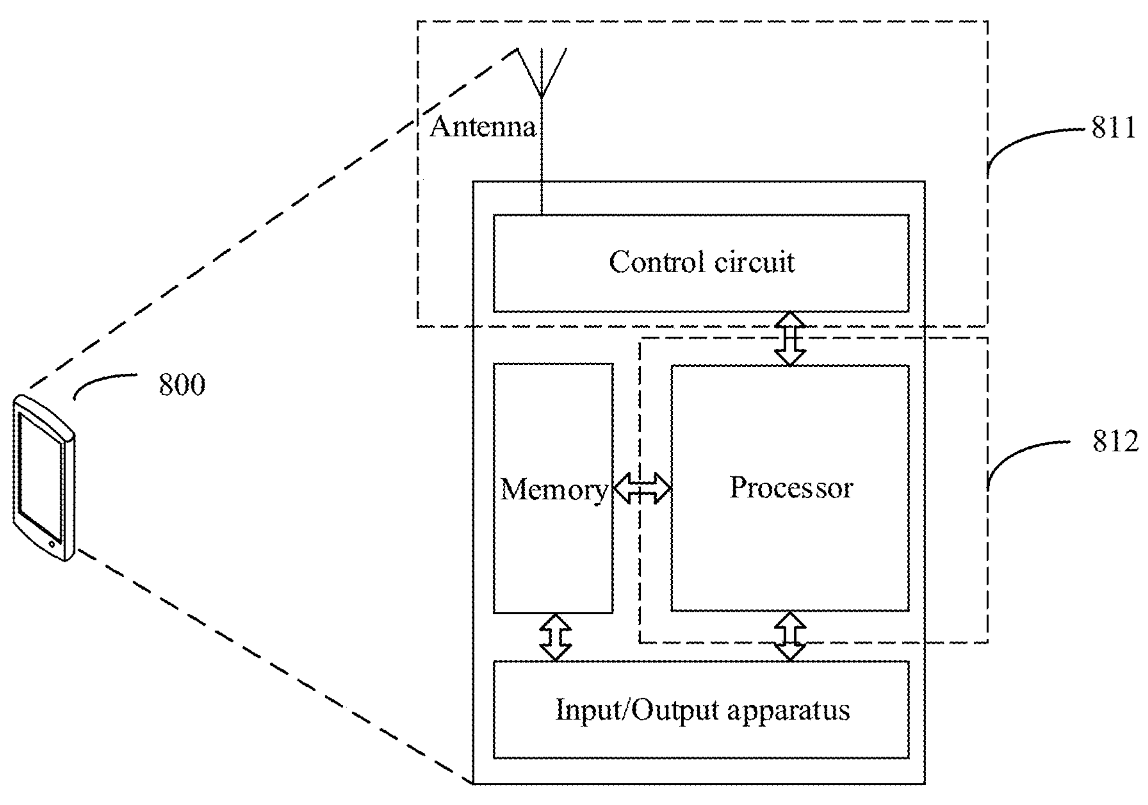
FIG. 8 is a schematic structural diagram of a terminal according to an embodiment of this application.

FIG. 8 is a schematic structural diagram of a terminal device. The terminal device may be applied to the scenario shown in FIG. 1, FIG. 2, FIG. 3, FIG. 4, or FIG. 5. For ease of description, FIG. 8 shows only main components of the terminal device. As shown in FIG. 8, the terminal device 800 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus, such as a touchscreen, a display, or a keyboard, is mainly configured to: receive data input by a user and output data to the user.

After the terminal device is powered on, the processor may read the software program in the storage unit, parse and execute instructions of the software program, and process data of the software program. When data needs to be sent wirelessly, the processor performs baseband processing on the to-be-sent data, and outputs a baseband signal to the radio frequency circuit. The radio frequency circuit processes the baseband signal to obtain a radio frequency signal, and sends the radio frequency signal to the outside by using an antenna in a form of an electromagnetic wave. When data is sent to the terminal device, the radio frequency circuit receives the radio frequency signal by using the antenna. The radio frequency signal is further converted into the baseband signal, and the baseband signal is output to the processor. The processor converts the baseband signal into data and processes the data.

For ease of description, FIG. 8 shows only one memory and one processor. In an actual terminal device, there may be a plurality of processors and memories. The memory may also be referred to as a storage medium, a storage device, or the like, which is not limited in this embodiment of the present application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 8 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected through various buses. The baseband processor may also be expressed as a baseband processing circuit or a baseband processing chip. The foregoing central processing unit may alternatively be expressed as a central processing circuit or a central processing chip. A function of processing the communication protocol and the communication data may be built in the processor, or may be stored in the storage unit in a form of a software program. The processor executes the software program to implement a baseband processing function.

In an example, an antenna and a control circuit having a transceiver function may be considered as a transceiver unit 811 of the terminal device 800, and a processor having a processing function may be considered as a processing unit 812 of the terminal device 800. As shown in FIG. 8, a terminal device 800 includes the transceiver unit 811 and the processing unit 812. The transceiver unit may also be referred to as a transceiver, a transceiver machine, a transceiver apparatus, or the like. Optionally, a component configured to implement the receiving function in the transceiver unit 811 may be considered as a receiving unit, and a component configured to implement the sending function in the transceiver unit 811 may be considered as a sending unit. That is, the transceiver unit 811 includes the receiving unit and the sending unit. For example, the receiving unit may also be referred to as a receiver machine, a receiver, a receiving circuit, or the like. The sending unit may be referred to as a transmitter machine, a transmitter, a transmitting circuit, or the like. Optionally, the receiving unit and the sending unit may be an integrated unit, or may be a plurality of independent units. The receiving unit and the sending unit may be located in one geographical location, or may be distributed in a plurality of geographical locations.

Figure 9:
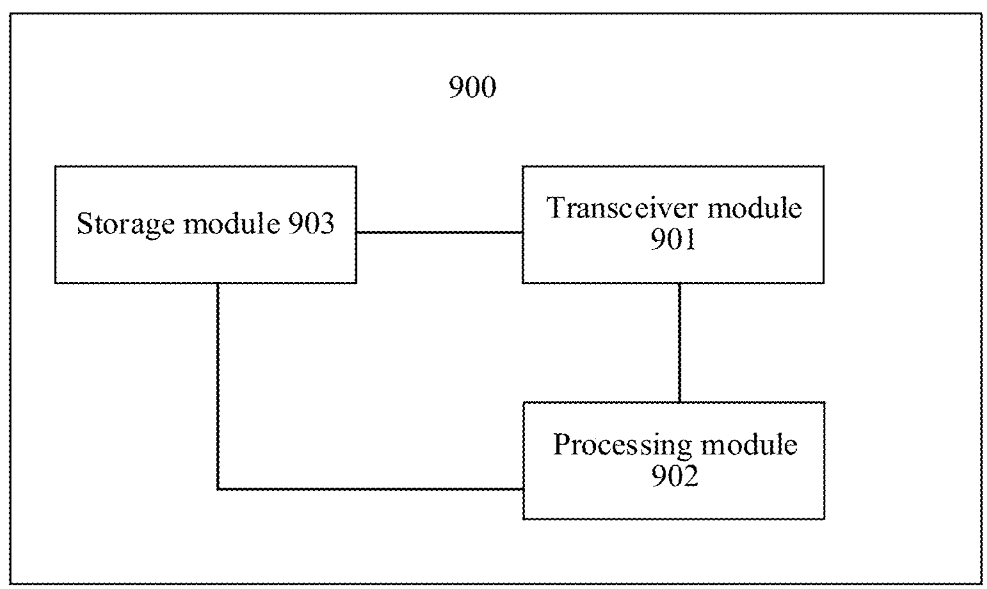
FIG. 9 is a schematic diagram of another communication apparatus according to an embodiment of this application.

As shown in FIG. 9, another embodiment of this application provides an apparatus 900. The apparatus may be a terminal, or may be a component (such as an integrated circuit or a chip) of the terminal. Alternatively, the apparatus may be a network device, or may be a component (such as an integrated circuit or a chip) of the network device. Alternatively, the apparatus may be other communication module, and configured to implement the method in the method embodiments of this application. The apparatus 900 may include a processing module 902 (or referred to as a processing unit). Optionally, the device may further include a transceiver module 901 (or referred to as a transceiver unit) and a storage module 903 (or referred to as a storage unit).

In a possible design, one or more modules in FIG. 9 may be implemented by one or more processors, or implemented by one or more processors and memories; or implemented by one or more processors and transceivers; or implemented by one or more processors, memories, and transceivers. This is not limited in this embodiment of this application. The processor, the memory, and the transceiver may be separately arranged, or may be integrated.

The apparatus has a function of implementing the terminal described in embodiments of this application. For example, the apparatus includes a corresponding module, unit, or means used by the terminal to perform the terminal-related steps described in embodiments of this application. The function, unit, or means may be implemented by using software, or may be implemented by a hardware, or may be implemented by the hardware executing a corresponding software, or may be implemented by combining the software and the hardware. Further, reference may be made in detail to the corresponding descriptions in the foregoing corresponding method embodiment. Alternatively, the apparatus has a function of implementing the network device described in embodiments of this application. For example, the apparatus includes a corresponding module, unit, or means used by the network device to perform the steps involved in the network device described in embodiments of this application. The function, unit, or means may be implemented by using software, or may be implemented by a hardware, or may be implemented by the hardware executing a corresponding software, or may be implemented by combining the software and the hardware. Further, reference may be made in detail to the corresponding descriptions in the foregoing corresponding method embodiment.

Optionally, modules in the apparatus 900 in this embodiment of this application may be configured to perform the method described in FIG. 6 in this embodiment of this application.

In a possible design, an apparatus 900 may include a processing module 902 and a transceiver module 901. The processing module 902 is configured to obtain service feature configuration information of data. The processing module 902 is further configured to configure to-be-transmitted data in the data based on the service feature configuration information and untransmitted data and/or transmitted data in the data. The transceiver module 901 is configured to communicate with a terminal based on the configuration of the to-be-transmitted data.

By using the apparatus, the integrity transmission can be performed on the XR video service, thereby improving the correct rate of the XR data packet and the satisfaction rate of the cell user and improving user experience of the XR service.

In some possible implementations of the apparatus 900, the service feature configuration information includes one or more of 5G quality of service identifier (5QI) information, quality of service flow identifier (QFI) information, quality of service template information, bearer information, or GTP information.

In some possible implementations of the apparatus 900, that the processing module 902 is configured to obtain service feature configuration information specifically includes: The processing module 902 is configured to obtain the service feature configuration information based on a configuration of a core network element.

In some possible implementations of the apparatus 900, that the processing module 902 is configured to configure to-be-transmitted data in the data based on untransmitted data and/or transmitted data in the data specifically includes: The processing module 902 is configured to set a priority for the to-be-transmitted data based on the untransmitted data and/or the transmitted data. Optionally, the processing module 902 is configured to: set a priority for the to-be-transmitted data based on a data volume of the untransmitted data and/or a data volume of the transmitted data, and based on one or more of a transmission delay of the transmitted data, an estimated transmission delay of the untransmitted data, a correct receiving rate of the transmitted data, an instantaneous transmission rate, or a historical transmission rate.

In some possible implementations of the apparatus 900, that the processing module 902 is configured to configure to-be-transmitted data in the data based on untransmitted data and/or transmitted data in the data specifically includes: The processing module 902 is configured to determine, based on the untransmitted data and/or the transmitted data, to skip sending a data unit of the transmitted data. Optionally, when the transmitted data is incorrectly transmitted, or when an estimated transmission time period of the untransmitted data is greater than a transmission time period threshold, or when the correct receiving rate of the transmitted data is less than a correct receiving rate threshold, the processing module 902 determines to skip sending the data unit of the to-be-transmitted data.

In some possible implementations of the apparatus 900, that the transceiver module 901 is configured to communicate with a terminal based on the configuration of the to-be-transmitted data specifically includes: The transceiver module 901 is configured to send transmission indication information of the to-be-transmitted data to the terminal, where the transmission indication information is used for processing the transmitted data. Optionally, the transmission indication information is used for indicating an integrity transmission criterion of the data, a quantity of data packets included in the to-be-transmitted data, and a data unit to which the data packet of the to-be-transmitted data belongs. Optionally, the transmission indication information is used for indicating a data unit to which a to-be-transmitted data packet that is not sent belongs.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, combine with other features as required. Correspondingly, the apparatus provided in this embodiment of this application may also correspondingly implement the features or functions. Details are not described herein again.

A person skilled in the art may further understand that various illustrative logical blocks and steps listed in embodiments of this application may be implemented by using an electronic hardware, a computer software, or a combination thereof. Whether a function is implemented by using hardware or software depends on particular applications and a design requirement of an entire system. A person skilled in the art may implement the functions by using various methods for a corresponding application. However, it should not be understood that the implementation goes beyond the protection scope of embodiments of this application.

It may be understood that the processor in this embodiment of this application may be an integrated circuit chip, and has a signal processing capability. In an implementation process, the steps in the foregoing method embodiments may be completed by using an integrated logic circuit of hardware in the processor or an instruction in a form of software. The processor may be a general purpose processor, a digital signal processor (digital signal processing, DSP), an application specific integrated circuit (application specific integrated circuit, ASIC), a field programmable gate array (field programmable gate array, FPGA) or another programmable logic device, a discrete gate or a transistor logic device, or a discrete hardware component.

The solutions described in this application may be implemented in various manners. For example, these techniques may be implemented in hardware, software, or a combination of hardware. For hardware implementations, the processing unit configured to performing the techniques at a communication apparatus (such as a base station, a terminal, a network entity, or a chip) may be implemented in one or more general purpose processors, DSPs, digital signal processing devices, ASICs, programmable logic devices, FPGAs, or other programmable logic apparatuses, discrete gate or transistor logic, discrete hardware components, or any combination thereof. The general purpose processor may be a microprocessor. Optionally, the general purpose processor may also be any conventional processor, controller, microcontroller, or state machine. The processor may also be achieved through the combination of computing apparatuses, such as combination of a digital signal processor and a microprocessor, multiple microprocessors, one or more microprocessors and one digital signal processor, or any other similar configurations.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through example but not limitative description, many forms of RAMs may be used, for example, a static random access memory (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced synchronous dynamic random access memory (enhanced SDRAM, ESDRAM), a synchronous link DRAM (synchlink DRAM, SLDRAM), and a direct rambus RAM (direct rambus RAM, DR RAM). It should be noted that the memories of the system and method described herein are intended to include, but are not limited to, these and any other suitable types of memories.

This application further provides a computer-readable medium. The computer-readable medium stores a computer program. When the computer program is executed by a computer, a function of any one of the foregoing method embodiments is implemented.

This application further provides a computer program product. When the computer program product is executed by the computer, a function of any one of the foregoing method embodiments is implemented.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures, or functions based on embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state disk (solid state disk, SSD)), or the like.

It may be understood that the "embodiment" mentioned in the specification means that a specific feature, structure, or characteristics related to the embodiment is included in at least one embodiment of this application. Therefore, the embodiments in the entire specification may not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that in this application, "when" and "if" all refer to corresponding processing performed by the apparatus in an objective case, and are not intended to limit a time, and are not required to perform a determining action during implementation of the apparatus, nor does it imply that there is any other limitation.

In this application, "at the same time" may be understood as being at a same time point, may be understood as being in a period of time, or may be understood as being in a same period.

A person skilled in the art may understand that the first number, the second number, and the like in this application are merely distinguished for ease of description, and are not intended to limit the scope of this embodiment of this application. A specific value of a number (which may also be referred to as an index), a specific value of a quantity, and a location in this application are merely used for illustration purposes, and are not unique representation forms, and are not intended to limit the scope of this embodiment of this application. The first number, the second number, and the like in this application are merely distinguished for ease of description, and are not intended to limit the scope of embodiments of this application.

An element represented by a singular number in this application is intended to represent "one or more" but not "one and only one", unless otherwise specified. In this application, unless otherwise specified, "at least one" is intended to represent "one or more", and "multiple" is intended to represent "two or more".

In addition, the terms "system" and "network" may be used interchangeably in this specification. The term "and/or" in this specification is merely an association relationship for describing an associated object, and indicates that three relationships may exist. For example, A and/or B may represent only A exists, both A and B exist, and only B exists, where A may be a singular number or a plural number, and B may be a singular number or a plural number. The character "/" generally represents that the associated object is in an "or" relationship.

In this specification, the term "at least one of" or "at least one type of" means all or any combination of the listed items, for example, "at least one of A, B, and C" may represent there are six cases in which A exists alone, B exists alone, C exists alone, A and B exist at the same time, B and C exist at the same time, where A may be a singular number or a plural number, B may be a singular number or a plural number, and C may be a singular number or a plural number.

It may be understood that, in embodiments of this application, "B corresponding to A" represents that B is associated with A, and B may be determined based on A. However, it should further be understood that determining A according to B does not mean that B is determined according to A only; that is, B may also be determined according to A and/or other information.

Correspondence relationships shown in tables in this application may be configured, or may be predefined. Values of the information in each table are merely examples, and may be configured as other values, which are not limited in this application. When a correspondence between the information and the parameters is configured, not all the correspondences shown in the tables need to be configured. For example, in the table in this application, correspondences shown in some rows may not be configured. For another example, proper deformation adjustment, for example, splitting, merging, and the like, may be performed based on the foregoing table. Names of the parameters indicated by the headings in the foregoing tables may alternatively use other names that can be understood by the communication apparatus, and values or representation manners of the parameters may alternatively use other values or representation manners that can be understood by the communication apparatus. During implementation of the foregoing tables, another data structure, such as an array, a queue, a container, a stack, a linear table, a pointer, a linked list, a tree, a graph, a structure, a class, a pile, a hash list, or a hash table, may alternatively be used.

Predefinition in this application may be understood as definition, pre-definition, storage, pre-store, pre-negotiation, pre-configuration, solidification, or pre-burning.

A person of ordinary skill in the art may be understood that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for convenient and brief description, for a detailed working process of the foregoing system, apparatus, and units, refer to a corresponding process in the foregoing method embodiments, and details are not described herein again.

It may be understood that the system, the apparatus, and the method described in this application may alternatively be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, a USB flash drive, a removable hard disk, a read-only memory (read-only memory, ROM), a random access memory (random access memory, RAM), a magnetic disk, an optical disc, and the like.

The same or similar parts between the various embodiments in this application may refer to each other. In each embodiment and each implementation/implementation method/implementing method in embodiments of this application, unless otherwise specified or logically conflicted, terms and/or descriptions of the implementation/implementation method/implementing method in the embodiments are consistent and may be referenced by each other. Technical features in different embodiments and implementations in each implementation/implementation method/implementing method may be combined to form a new embodiment, implementation, implementation method, or implementing method according to an internal logical relationship of the technical features. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:

obtaining service feature configuration information of data;

configuring to-be-transmitted data in the data based on the service feature configuration information and at least one of untransmitted data or transmitted data in the data;

sending transmission indication information indicates an integrity transmission criterion of the data, a quantity of data packets comprised in the to-be-transmitted data; and communicating with a terminal based on the configuration of the to-be-transmitted data which further includes sending transmission indication information of the to-be-transmitted data to the terminal, wherein the transmission indication information is used for processing the transmitted data wherein the transmission indication information further indicates a data unit to which the data packet of the to-be-transmitted data belongs.

2. The method according to claim 1, wherein the service feature configuration information comprises one or more of 5G quality of service identifier (5QI) information, quality of service flow identifier (QFI) information, quality of service profile information, bearer information, or general packet radio service tunneling protocol (GTP) information.

3. The method according to claim 1, wherein the obtaining service feature configuration information comprises:

obtaining the service feature configuration information based on a configuration of a core network element.

4. The method according to claim 1, wherein the configuring to-be-transmitted data in the data based on at least one of untransmitted data or transmitted data in the data comprises:

setting a priority for the to-be-transmitted data based on at least one of the untransmitted data or the transmitted data.

5. The method according to claim 4, wherein the setting a priority for the to-be-transmitted data based on at least one of the untransmitted data or the transmitted data comprises:

setting the priority for the to-be-transmitted data based on a data volume of at least one of the untransmitted data or a data volume of the transmitted data, and based on one or more of a transmission delay of the transmitted data, an estimated transmission delay of the untransmitted data, a correct receiving rate of the transmitted data, an instantaneous transmission rate, or a historical transmission rate.

6. An apparatus, comprising:

one or more processors; and a memory having instructions stored thereon that, when executed by the one or more processors, cause the apparatus to:

obtain service feature configuration information of data;

configure to-be-transmitted data in the data based on the service feature configuration information and at least one of untransmitted data or transmitted data in the data;

send transmission indication information that indicates an integrity transmission criterion of the data and that is used for processing the transmitted data and further indicates a data unit to which the data packet of the to-be-transmitted data belongs, and further indicates a quantity of data packets comprised in the to-be-transmitted data; and communicate with a terminal based on the configuration of the to-be-transmitted data.

7. The apparatus according to claim 6, wherein the service feature configuration information comprises one or more of 5G quality of service identifier (5QI) information, quality of service flow identifier (QFI) information, quality of service profile information, bearer information, or general packet radio service tunneling protocol (GTP) information.

8. The apparatus according to claim 6, wherein the instructions, when executed by the one or more processors, cause the apparatus to obtain the service feature configuration information based on a configuration of a core network element.

9. The apparatus according to claim 6, wherein the instructions, when executed by the one or more processors, cause the apparatus to set a priority for the to-be-transmitted data based on at least one of the untransmitted data or the transmitted data.

10. The apparatus according to claim 9, wherein the instructions, when executed by the one or more processors, cause the apparatus to set the priority for the to-be-transmitted data based on at least one of the untransmitted data or the transmitted data, comprising:

the apparatus is caused to set the priority for the to-be-transmitted data based on a data volume of at least one of the untransmitted data or a data volume of the transmitted data, and based on one or more of a transmission delay of the transmitted data, an estimated transmission delay of the untransmitted data, a correct receiving rate of the transmitted data, an instantaneous transmission rate, or a historical transmission rate.

11. A non-transitory computer readable medium storing instructions that are executable at least one processor of a first communication apparatus to cause the first communication apparatus to perform the steps of:

obtaining service feature configuration information of data;

configuring to-be-transmitted data in the data based on the service feature configuration information and at least one of untransmitted data or transmitted data in the data; and communicating with a terminal based on the configuration of the to-be-transmitted data and sending transmission indication information which indicates an integrity transmission criterion of the data, and a quantity of data packets comprised in the to-be-transmitted data and sending transmission indication information of the to-be-transmitted data to the terminal, wherein the transmission indication information is used for processing the transmitted data which further indicates a data unit to which the data packet of the to-be-transmitted data belongs.

12. The non-transitory computer readable medium according to claim 11, wherein the service feature configuration information comprises one or more of 5G quality of service identifier (5QI) information, quality of service flow identifier (QFI) information, quality of service profile information, bearer information, or general packet radio service tunneling protocol (GTP) information.

13. The non-transitory computer readable medium according to claim 11, wherein the obtaining service feature configuration information comprises:

obtaining the service feature configuration information based on a configuration of a core network element.

14. The non-transitory computer readable medium according to claim 11, wherein the configuring to-be-transmitted data in the data based on at least one of untransmitted data or transmitted data in the data comprises:

setting a priority for the to-be-transmitted data based on at least one of the untransmitted data or the transmitted data.

15. The non-transitory computer readable medium according to claim 14, wherein the setting a priority for the to-be-transmitted data based on at least one of the untransmitted data or the transmitted data comprises:

setting the priority for the to-be-transmitted data based on a data volume of at least one of the untransmitted data or a data volume of the transmitted data, and based on one or more of a transmission delay of the transmitted data, an estimated transmission delay of the untransmitted data, a correct receiving rate of the transmitted data, an instantaneous transmission rate, or a historical transmission rate.

* * * * *